(12) United States Patent
Sugihara et al.

(10) Patent No.: US 11,555,952 B2
(45) Date of Patent: Jan. 17, 2023

(54) DISPLAY AND METHOD OF PRODUCING DISPLAY

(71) Applicant: TOPPAN PRINTING CO., LTD., Tokyo (JP)

(72) Inventors: Keitaro Sugihara, Tokyo (JP); Hanako Yamamoto, Tokyo (JP); Tomoko Tashiro, Tokyo (JP); Kazuhiro Yashiki, Tokyo (JP)

(73) Assignee: TOPPAN PRINTING CO., LTD., Tokyo (JP)

(*) Notice: Subject to any disclaimer, the term of this patent is extended or adjusted under 35 U.S.C. 154(b) by 218 days.

(21) Appl. No.: 16/890,314

(22) Filed: Jun. 2, 2020

(65) Prior Publication Data
US 2020/0301052 A1 Sep. 24, 2020

Related U.S. Application Data

(63) Continuation of application No. PCT/JP2018/046401, filed on Dec. 17, 2018.

(30) Foreign Application Priority Data

Dec. 18, 2017 (JP) .............................. JP2017-241723
Dec. 27, 2017 (JP) .............................. JP2017-251632

(51) Int. Cl.
*G09F 19/14* (2006.01)
*G02B 5/28* (2006.01)
(Continued)

(52) U.S. Cl.
CPC ............. *G02B 5/285* (2013.01); *G02B 5/045* (2013.01); *G02B 5/22* (2013.01)

(58) Field of Classification Search
CPC .......... G02B 5/285; G02B 5/045; G02B 5/22; G02B 5/26; G02B 5/04; G02B 5/28;
(Continued)

(56) References Cited

U.S. PATENT DOCUMENTS

2008/0171144 A1 7/2008 Raksha et al.
2008/0259456 A1* 10/2008 Schilling ................ B42D 25/29
359/571
(Continued)

FOREIGN PATENT DOCUMENTS

DE 10 2010 047 250 A1 6/2011
JP 3006667 B2 2/2000
(Continued)

OTHER PUBLICATIONS

Aono, Examiner provided machine translation of JP 2013233733 A, of record (Year: 2013).*

(Continued)

*Primary Examiner* — Balram T Parbadia
(74) *Attorney, Agent, or Firm* — Foley & Lardner LLP

(57) ABSTRACT

A display having high resistance to counterfeiting including a micro concavo-convex structure layer on a predetermined reference surface, the micro concavo-convex structure layer having a plurality of microstructures arranged on the reference surface. Each of the microstructures is formed of a prism structure made of a material that transmits light with a triangular cross-section having a first surface inclined relative to the reference surface in side view, and a second surface having an inclination angle relative to the reference surface such that the inclination angle is larger than an inclination angle of the first surface relative to the reference surface. A color layer as an example of a functional layer is provided on the second surface of all or some of the plurality of microstructures.

18 Claims, 27 Drawing Sheets

(51) Int. Cl.
*G02B 5/04* (2006.01)
*G02B 5/22* (2006.01)

(58) Field of Classification Search
CPC ...... G02B 5/08; B42D 25/324; B42D 25/369; B42D 25/373; B42D 25/41; B42D 25/425; G09F 19/14
See application file for complete search history.

(56) References Cited

U.S. PATENT DOCUMENTS

| | | |
|---|---|---|
| 2012/0319395 A1 | 12/2012 | Fuhse et al. |
| 2019/0105939 A1 | 4/2019 | Tashiro et al. |

FOREIGN PATENT DOCUMENTS

| | | |
|---|---|---|
| JP | 2004-054154 A | 2/2004 |
| JP | 2011-221054 A | 11/2011 |
| JP | 2013-233733 A | 11/2013 |
| JP | 2015-108939 A | 6/2015 |
| WO | WO-2013/180231 A1 | 12/2013 |
| WO | WO-2016/075928 A1 | 5/2016 |
| WO | WO-2017/138536 A1 | 8/2017 |
| WO | WO-2017/213242 A1 | 12/2017 |

OTHER PUBLICATIONS

International Searching Authority, "International Search Report," issued in connection with International Patent Application No. PCT/JP2018/046401, dated Mar. 12, 2019.
International Searching Authority, "Written Opinion," issued in connection with International Patent Application No. PCT/JP2018/046401, dated Mar. 12, 2019.
Extended European Search Report dated Jan. 14, 2021 for corresponding European Patent Application No. 18892403.9.

* cited by examiner

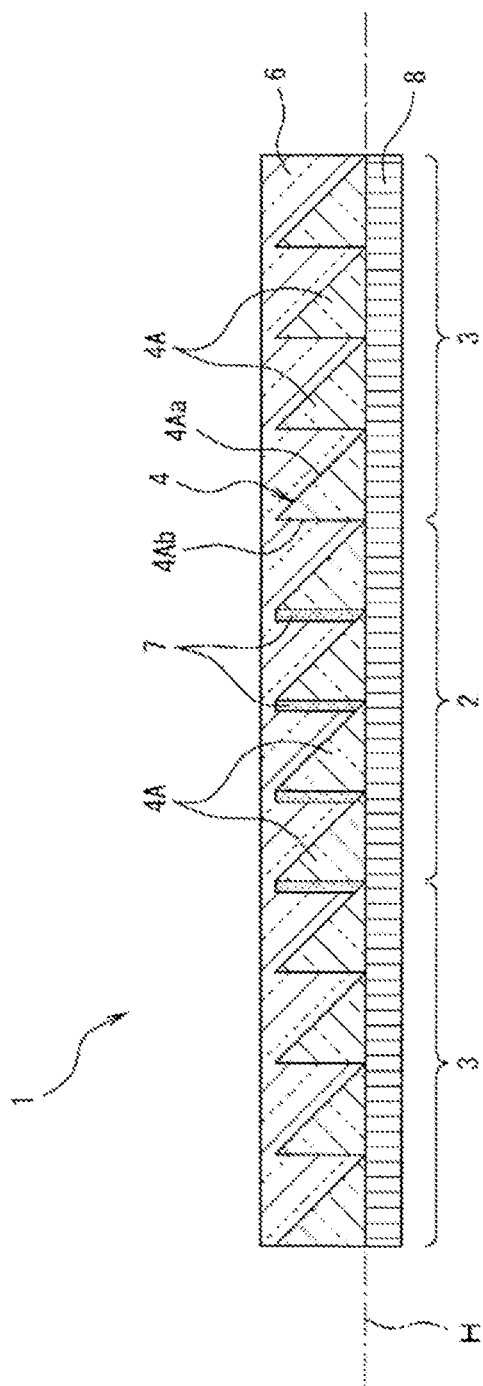

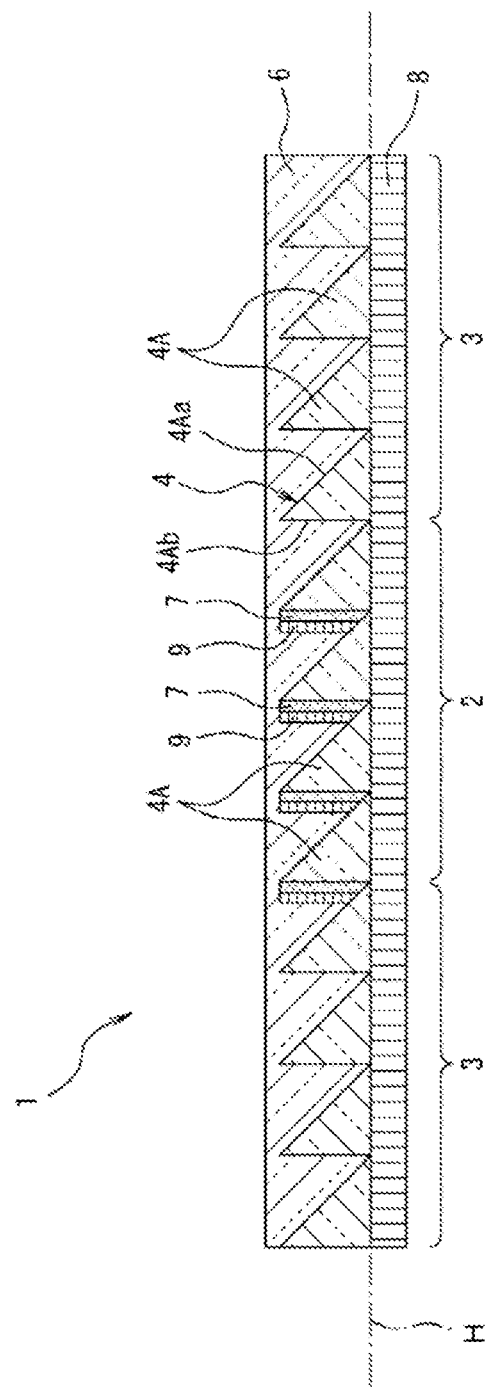

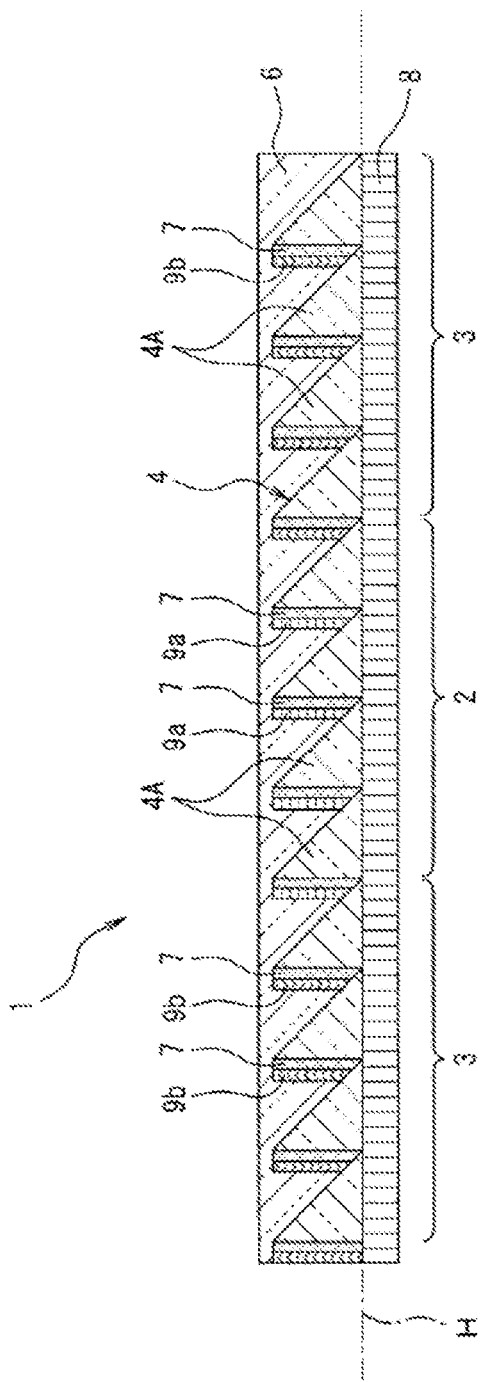

DISPLAY AND METHOD OF PRODUCING DISPLAY

CROSS-REFERENCE TO RELATED PATENT APPLICATIONS

This application is a continuation application filed under 35 U.S.C. § 111(a) claiming the benefit under 35 U.S.C. §§ 120 and 365(c) of International Patent Application No. PCT/JP2018/046401, filed on Dec. 17, 2018, which is based upon and claims the benefit of priority to Japanese Patent Applications Nos. 2017-241723, filed on Dec. 18, 2017; and, 2017-251632, filed Dec. 27, 2017, the disclosures of which are all incorporated herein by reference in their entireties.

BACKGROUND

Technical Field

A display having an overt feature that provides different images depending on the observation conditions.

Background Art

In recent years, OVDs have been used as an example of techniques for expressing an optical effect. OVD is an abbreviation for "optical(ly) variable device." OVDs are, for example, devices that display a three-dimensional image or a special decorative image by using light interference, or use a hologram or diffraction grating for expressing a special color shift or the like. Further, OVDs are related to techniques such as multilayer thin films in which thin films with different optical properties are optically multilayered to cause a color shift depending on the viewing angle.

For the color shift, there is a phenomenon that causes colors to be exhibited and shift due to materials and structures of the OVDs. The phenomenon is attributed to the properties of light, which vary depending on the wavelength of light. In the present specification, colors that exhibit such color shift are called structural colors. Optical phenomena related to expression of structural colors include multilayer film interference, thin film interference, refraction, dispersion, light scattering, Mie scattering, diffraction, and diffraction grating.

The OVDs are formed and used on the entirety or part of credit cards, securities, certificates, and the like as an effective counterfeit prevention means since the securities, certificates, and the like require advanced manufacturing techniques, and have a unique visual effect that enables authenticity verification at a glance. Displays using these OVDs have recently been affixed to sports goods, software for electronic products such as computer parts, and the like, in addition to the securities. Such displays have been widely used as authentication seals that prove the product authenticity or tamper seals affixed to the packages of such products.

OVDs have contributed to counterfeit prevention by providing a three-dimensional expression using a diffraction grating or expressing a change of image. However, OVDs are difficult to use to verify authenticity due to failure to produce clear colors, and are limited in expression of colors, since the expression by using a diffraction grating causes occurrence of iridescent interference light.

Techniques for counterfeit prevention are disclosed, for example, in PTLs 1 to 4.

PTL 1 discloses an optical element capable of expressing colors by combining RGB separated images. However, this optical element expresses specific colors poorly since color expression by using a diffraction grating causes occurrence of optical interference.

PTL 2 discloses a technique for expressing a specific color by combining a lenticular lens and printing. Further, PTL 3 discloses a technique, which utilizes a microstructure and transparency of an optical element, for expressing colors by a method other than iridescent expression by using a combination with printing.

However, the optical elements described in PTLs 2 and 3 do not achieve both the visibility of the underlayer and the effect of color expression since the print layer is provided.

Further, PTL 4 discloses a technique in which an optical element, having a reflective layer directly on the microstructure, has transparency so that the underlayer can be seen. However, the technique described in PTL 4, which is a combination of a reflective layer and a microstructure, has limitations in color expression.

Displays in each of which two or more images can be observed are used as counterfeit prevention media having an overt feature.

The displays having such an overt feature are required to have visibility for images that appear on the display.

Accordingly, it is required to provide a display having an aesthetic appearance to an observer, and provide an optical technique having various visual effects by incident light emitted upon illumination.

For example, for the display disclosed in PTL 2, there is described a technique that uses a lenticular lens as described above to provide different pieces of information at predetermined angles. Further, for the display disclosed in PTL 5, there is described a technique in which different metallic images are printed by ink jet printing on each of first and second inclined surfaces of a prism structure to provide different pieces of information at predetermined angles.

In addition, for the display disclosed in PTL 6, there is described a technique in which an optically reflective layer is laminated on one of inclined surfaces of a prism structure to have reflectivity at a specific angle.

However, the lenticular lens of PTL 2 is required to be provided on the displayed image. If the displayed image and adhesion position of the lenticular lens are misaligned, images may be blurred or overlaid. Accordingly, the display of PTL 2 requires a control unit or the like for positioning and adhesion with high accuracy, and this makes it difficult to obtain a product with high visibility.

Further, in printing of a metallic image by using ink jet printing of PTL 5, a decrease in resolution cannot be avoided to some extent in printing on a prism surface. Accordingly, a prism structure itself may be observed. In this case, the visibility of the display of PTL 5 is reduced.

Further, the display having reflectivity as in PTL 6 can reflect light incident thereon at a specific angle, but has difficulty in developing colors. As a result, the display can form only monotonous images.

The displays of PTLs 2, 5, and 6 are the same in that two images can be seen at different angles.

[Citation List] [Patent Literature] PTL 1: JP 2011-221054 A; PTL 2: JP 3006667 B; PTL 3: WO2016/075928; PTL 4: WO2013/180231; PTL 5: Japanese Patent Application No. 2015-108939; PTL 6: Japanese Patent Application No. 2004-54154.

SUMMARY OF THE INVENTION

Technical Problem

For cards, passports, and bills, displays with high visibility are desired. The displays with high visibility have high verification performance by visual inspection. Visual inspection is suitable for detection of counterfeit products in an off-line environment, which is unconnected to a network.

The present embodiments have been made in view of the above issues, and are directed to provide a display that arises different images under a plurality of observation conditions, and has high verification performance, which contributes to an improved resistance to counterfeiting.

Solution to Problem

A display according to an aspect of the present disclosure for solving the problem includes a micro concavo-convex structure layer provided on a predetermined reference surface, the micro concavo-convex structure layer including a plurality of microstructures arranged on the reference surface, wherein each of the microstructures is formed of a prism structure made of a material having a triangular cross-section, that transmits light, having a first surface inclined relative to the reference surface in side view, and a second surface having an inclination angle relative to the reference surface such that the inclination angle is larger than an inclination angle of the first surface relative to the reference surface, and a functional layer is provided on the second surface of all or some of the plurality of microstructures.

The above functional layer may be a color layer or an optically variable layer. The optically variable layer may be a dielectric multilayer, cholesteric liquid crystal layer, or the like.

Advantageous Effects of Invention

The present embodiments relate to a display that reflects and transmits illumination light to provide images which appear passively. The present embodiments can be applied to displays having an overt feature provided in cards, passports, bills, and the like. Further, the present embodiments can be applied to displays having a plurality of fine reflective plates inclined at a predetermined angle, or articles in which the display is attached on a print layer.

According to an aspect of the present disclosure, an image of a specific color can appear at a specific observation angle with a simple configuration. Thus, according to an aspect of the present invention, different images can be observed by different observation methods. According to an aspect of the present disclosure, an image that varies depending on the observation method is compared with a genuine product to determine authenticity. Therefore, high verification performance is achieved. In other words, detection of counterfeit products is improved. Further, the image that varies depending on the observation method makes the display of the present disclosure impressive as a novel visual effect.

BRIEF DESCRIPTION OF THE DRAWINGS

FIG. 7 is a cross-sectional view illustrating a display according to a second embodiment.

FIG. 13 is a cross-sectional view illustrating a display according to a third embodiment.

FIG. 21 is a cross-sectional view illustrating a display according to another modified example.

FIGS. 25(a), 25(b), and 25(c) are plan views illustrating an image that appears when a display of the fifth embodiment is observed in different observation directions, in which FIG. 25(a) is a view illustrating an image that appears under a condition that the observation is performed from the same side as a light source, and the display is observed in a direction perpendicular to the front thereof, FIG. 25(b) is a view illustrating an image that appears under a condition that the observation is performed from the same side as a light source, and the display is observed in a direction not perpendicular to the front thereof, and FIG. 25(c) is a view illustrating an image that appears under a condition that the observation is performed from an opposite side to a light source, and the display is observed in a direction perpendicular to the front thereof.

FIGS. 26(a), 26(b), and 26(c) are schematic views illustrating a mechanism according to the fifth embodiment, in which FIG. 26(a) is a view illustrating a mechanism of FIG. 25(a), FIG. 26(b) is a view illustrating a mechanism of FIG. 25(b), and FIG. 26(c) is a view illustrating a mechanism of FIG. 25(c).

FIGS. 29(a), 29(b), and 29(c) are views illustrating the appearance of one embodiment of the display when it is observed in different observation directions, in which FIG. 29(a) is a view illustrating an image displayed when the observation is performed from the same side as a light source, and the display is observed in a direction perpendicular to the front thereof, FIG. 29(b) is a view illustrating an image displayed when the observation is performed from the same side as a light source, and the display is observed in a direction not perpendicular to the front thereof, and FIG. 29(c) is a view illustrating an image displayed when the observation is performed from an opposite side to a light source with the display interposed therebetween, and the display is observed in a direction perpendicular to the front thereof.

DETAILED DESCRIPTION

Figure 1:
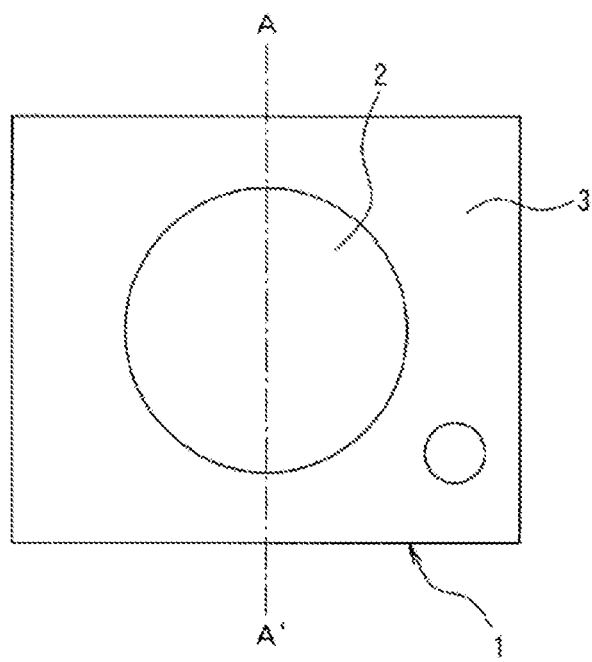
FIG. 1 is a plan view illustrating a display according to an embodiment of the present disclosure.

Referring to the drawings, embodiments of the present invention will be detailed below. The following description will be given of embodiments of the present invention with reference to the drawings.

Note that these embodiments are intended to describe the gist of the invention, and should not limit the interpretation of the embodiments. It should be noted that they are representative examples of the present invention. The representative embodiments described below are merely examples of the present invention, and those skilled in the art can modify their design as appropriate.

Further, the drawings are illustrative, and the depicted dimensions, for example, the thicknesses of the layers and the ratio thereof, may be different from actual ones. The dimensional ratio in the drawings should not be interpreted as being limited to the depicted ratio. Further, unless there is a reason for the sake of convenience, the same components in the embodiments are denoted by the same reference signs, and duplicated description will be omitted.

The embodiments of the present invention will now be specifically described with reference to the drawings. The following description will be given of embodiments of the present invention with reference to the drawings. The present invention is not limited to the following embodiments, and it should be noted that these embodiments are representative examples of the present invention. The representative embodiments described below are merely examples of the present invention, and those skilled in the art can modify their design as appropriate. Further, unless there is a reason for the sake of convenience, the same components are denoted by the same reference signs, and duplicated description will be omitted.

Throughout the drawings, the same parts are denoted by the same reference signs, and the embodiments of the present disclosure are a group of embodiments based on a unique and unitary invention over the background. Further, aspects of the present disclosure are aspects of a group of embodiments based on a single invention. Configurations of the present disclosure include aspects of the present disclosure. Features of the present disclosure can be combined with each other and constitute each configuration. Accordingly, features of the present disclosure, configurations of the present disclosure, aspects of the present disclosure, and embodiments of the present disclosure can be combined with each other, and these combinations have synergistic functions and can obtain synergistic effects.

The first to fourth embodiments described below are embodiments in which a functional layer provided on a second surface is a color layer. Further, the fifth embodiment is an embodiment in which a functional layer provided on a second surface is an optically variable layer. These first to fifth embodiments are embodiments of the present disclosure.

First Embodiment

A first embodiment will now be described.

As shown in FIG. 1, a display 1 of the present embodiment has a plurality of display regions in plan view. In the present embodiment, two continuous display regions 2 and 3 are shown. However, three or more display regions may be provided, or the display regions may be separated from each other. Hereinafter, the display regions 2 and 3 may also be simply referred to as regions 2 and 3.

Figure 2:
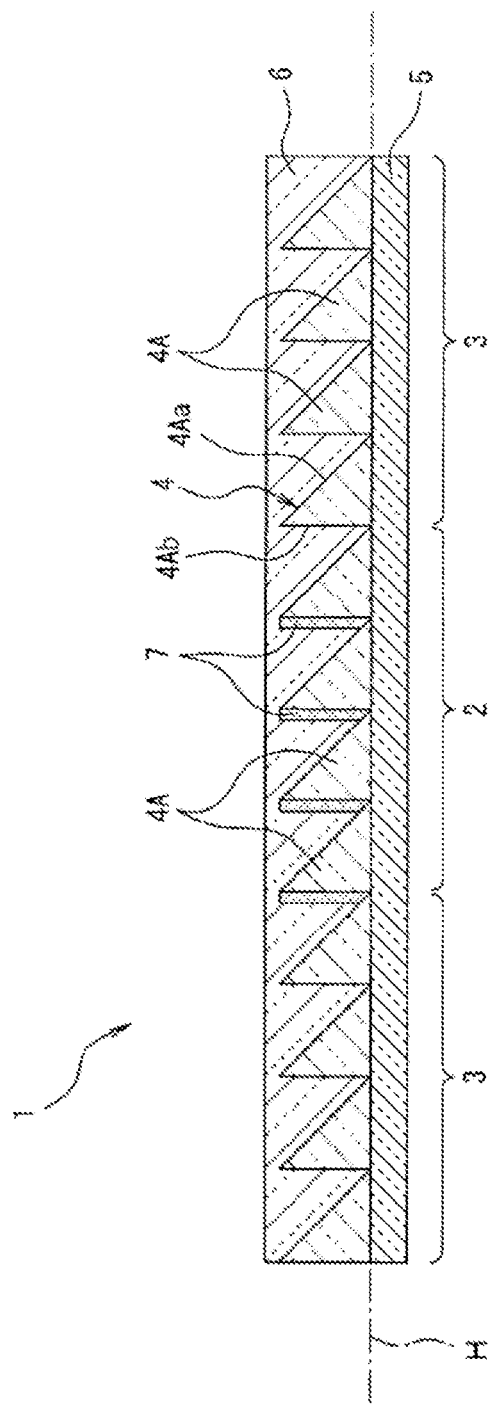
FIG. 2 is a cross-sectional view taken along the line A-A' of FIG. 1 for illustrating a display.

Further, as shown in FIG. 2, the display 1 of the present embodiment includes a substrate layer 5, a micro concavo-convex structure layer 4 formed on the substrate layer 5, and a protective layer 6 formed to cover the asperities of the micro concavo-convex structure layer 4.

In the present embodiment, a position at the underside of the substrate layer 5 or a position at the underside of the micro concavo-convex structure layer 4 is set as a reference surface H. That is, the protective layer 6, which is made of a material that transmits light and covers the asperities of the micro concavo-convex structure layer 4, is provided on the surface of the micro concavo-convex structure layer 4 on which the reference surface H is not provided.

Further, when there is a layer laminated on a first surface or a second surface, the protective layer 6 is formed on the laminated layer.

The reference surface H may be a curved surface.

In the present embodiment, the substrate layer 5 may be a layer integrally formed with the micro concavo-convex structure layer 4. The substrate layer 5 may be omitted. Further, the substrate layer 5, the micro concavo-convex structure layer 4 (excluding a color layer 7), and the protective layer 6 are each made of a resin material that transmits light. The micro concavo-convex structure layer 4 and the protective layer 6 may have the same or different refractive indices of light. The protective layer 6 may be made of the same material as that of the micro concavo-convex structure layer 4, which will be described later. The protective layer 6 may be omitted.

In the present embodiment described below, the micro concavo-convex structure layer 4 is provided in the regions 2 and 3, and the color layer 7 described later is provided only in a portion corresponding to the region 2.

<Micro Concavo-Convex Structure Layer 4>

As shown in FIG. 2, the micro concavo-convex structure layer 4 is a structure provided on the reference surface H, and the micro concavo-convex structure layer 4 includes a plurality of microstructures 4A arranged on the reference surface H.

Figure 3:
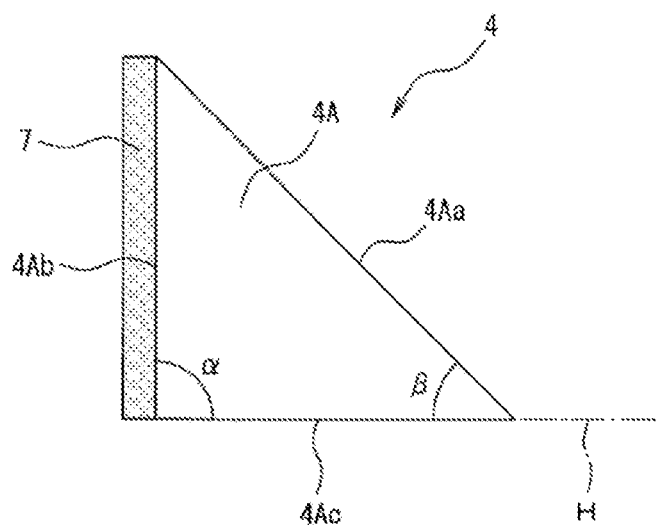
FIG. 3 is a side view illustrating a microstructure according to a first embodiment of the present disclosure.

As shown in FIG. 3, each microstructure 4A is a prism structure with a triangular cross-section having a first surface 4Aa inclined upward relative to the reference surface H in side view, and a second surface 4Ab having an inclination angle α relative to the reference surface H such that the inclination angle α is larger than an inclination angle β of the first surface 4Aa relative to the reference surface H. A bottom 4Ac, which corresponds to the bottom of the triangular cross-section of the microstructure 4A, is set to be parallel to the reference surface H. It should be noted that the first surface 4Aa and the second surface 4Ab may be a flat surface, or a curved surface whose profile has a curvature.

The bottoms 4Ac of the plurality of microstructures are located on the same reference surface H. The bottoms 4Ac of the adjacent microstructures may also be located slightly vertically offset from each other (for example, within a range of 2 μm or less).

Further, the plurality of microstructures 4A may be continuously arranged on the reference surface H, or may be arranged with a gap between adjacent microstructures 4A. FIG. 2 shows that the microstructures 4A are formed in continuous serrated asperities. When a gap is provided between adjacent microstructures 4A, a horizontal length of the gap may be smaller than that of the bottom 4Ac (a horizontal dimension of the bottom 4Ac in FIG. 2) of the microstructure 4A adjacent to the gap. With this configuration, the effectiveness of the optical function can be improved.

The inclination angle β of the first surface 4Aa relative to the reference surface H can be set in the range of 1 degree or more and less than 90 degrees, and more preferably in the range of 30 degrees or more and 60 degrees or less. In the present embodiment, the inclination angle β is 45 degrees, and the horizontal length of the bottom 4Ac and the height of the microstructure 4A are the same.

The inclination angle α of the second surface 4Ab relative to the reference surface H is set to be larger than the inclination angle β of the first surface 4Aa. The inclination angle α of the second surface 4Ab can be in the range of 80 degrees or more and 100 degrees or less. In the present embodiment described below, the second surface 4Ab is a vertical surface, which is perpendicular to the reference surface H, and the inclination angle α of the second surface 4Ab is set to 90 degrees.

The size of the microstructure 4A can be a micrometer size. That is, each of the height and the horizontal length of the microstructure 4A can be 50 μm or less. Furthermore, the height may be in the range of 2 μm or more and 10 μm or less, or the horizontal length (length in the arrangement direction) of the bottom 4Ac may be in the range of 2 μm or more and 30 μm or less. The horizontal dimension of the bottom 4Ac is a dimension in side view as shown in FIG. 3. Each microstructure 4A may be a planar rectangular block-shaped structure, or may be a shape elongated in the vertical direction in the sheet of drawing.

Further, when the microstructure 4A has a micrometer size, the dimensions of the microstructure 4A can be such that iridescent interference light due to diffraction by the concavo-convex structure of the plurality of microstructures 4A is unlikely to occur.

Figure 4A:
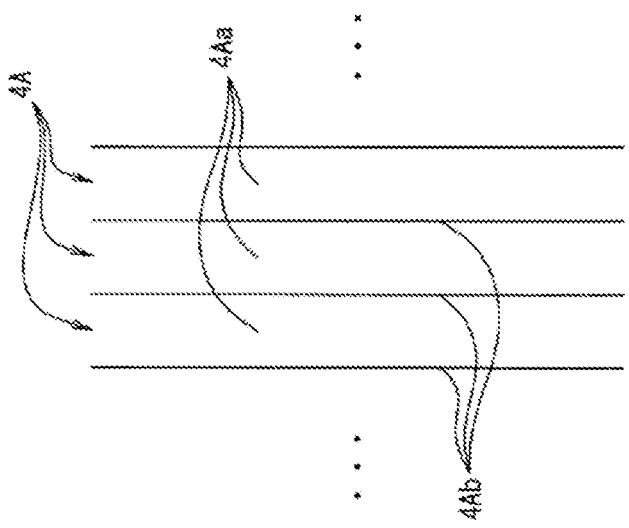
FIGS. 4(a), 4(b), and 4(c) are schematic plan views illustrating an arrangement example of microstructures.
Figure 4B:
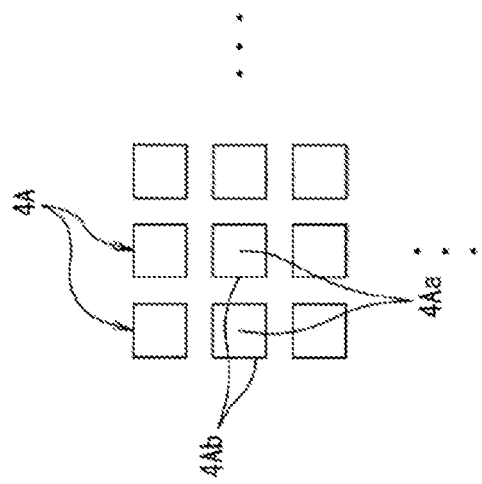

Here, as shown in a schematic plan view in FIG. 4(a), each microstructure 4A has a cylindrical shape extending in a direction that intersects the arrangement direction (horizontal direction in the sheet of drawing) of the microstructures 4A (in FIG. 4(a), a direction orthogonal to the arrangement direction). As shown in a schematic plan view in FIG. 4(b), the microstructure 4A may have a block-shaped bottom 4Ac. The block-shape can be a square or the like. Further, as shown in a schematic plan view in FIG. 4(c), the blocks of the plurality of microstructures 4A may be arranged in a predetermined pattern in which the blocks are oriented in different directions.

(Materials for Micro Concavo-Convex Structure Layer 4)

The micro concavo-convex structure layer 4, that is, the microstructures 4A, can be made of a light transmissive material.

The materials applied to the micro concavo-convex structure layer 4 may be any of a thermoplastic resin, a urethane resin, a thermosetting resin, or a composite material thereof. Further, in addition to those described above, materials that can form the above asperities and are transparent to light can also be applied. The thermoplastic resin can be an acrylic resin, an epoxy resin, a cellulose resin, a vinyl resin, or a polycarbonate resin. The urethane resin can be made of a urethane resin obtained by adding and cross-linking polyisocyanate, as a cross-linking agent, to acrylic polyol, polyester polyol, or the like having a reactive hydroxyl group. The thermosetting resin may be a melamine resin, an epoxy resin, or a phenol resin.

A relief structure can be provided on the micro concavo-convex structure layer 4 (formation of the microstructures 4A) by forming a concavo-convex shape by a microstructure formation process such as laser drawing, nanoimprinting, and embossing.

The following description is given of a case where the asperities constituting the microstructures 4A are formed by embossing the ultraviolet curable resin.

In this case, the material for the micro concavo-convex structure layer 4 may be an ultraviolet curable resin. The ultraviolet curable resin may be a monomer, oligomer or polymer having an ethylenically unsaturated bond or an ethylenically unsaturated group. The monomer may be 1,6-hexanediol, neopentyl glycol diacrylate, trimethylolpropane triacrylate, pentaerythritol triacrylate, pentaerythritol tetraacrylate, dipentaerythritol pentaacrylate, dipentaerythritol hexaacrylate, or the like. The oligomer may be epoxy acrylate, urethane acrylate, polyester acrylate, or the like. The polymer may be a urethane modified acryl resin or an epoxy-modified acryl resin.

When photocationic polymerization is applied to the material of the microstructure, monomers, oligomers, polymers, oxetane skeleton-containing compounds, and vinyl ethers having an epoxy group can be used. Further, when the above ionizing radiation-curable resin is cured by light such as ultraviolet light, a photopolymerization initiator can be added. A photoradical polymerization initiator, a photocationic polymerization initiator, or a combination thereof (hybrid type) can be selected depending on the resin.

Further, monomers, oligomers, polymers or the like having an ethylenically unsaturated bond or an ethylenically unsaturated group can be mixed, or a reactive group can be provided thereto in advance so that they can be crosslinked with each other by an isocyanate compound, a silane coupling agent, an organic titanate cross-linking agent, an organic zirconium cross-linking agent, an organic aluminate, or the like, or can be crosslinked with another resin skeleton by an isocyanate compound, a silane coupling agent, an organic titanate cross-linking agent, an organic zirconium cross-linking agent, an organic aluminate, or the like. With these methods, it is possible to obtain a polymer which has an ethylenically unsaturated bond or an ethylenically unsaturated group, and is present in a solid state at room temperature, and has low tackiness, good moldability, and less smearing of the original plate.

The photoradical polymerization initiator may be a benzoin-based compound, an anthraquinone-based compound, a phenyl ketone-based compound, benzyl dimethyl ketal, thioxanthone, acylphosphine oxide, or Michler's ketone. The benzoin-based compound may be benzoin, benzoin methyl ether, or benzoin ethyl ether. The anthraquinone-based compound may be anthraquinone, or methyl anthraquinone. The phenyl ketone-based compound may be acetophenone, diethoxy acetophenone, benzophenone, hydroxy acetophenone, 1-hydroxycyclohexyl phenyl ketone, α-amino acetophenone, or 2-methyl-1-(4-methylthiophenyl)-2-morpholinopropane-1-one.

When a photocationically polymerizable compound is used, the photocationic polymerization initiator may be an aromatic diazonium salt, an aromatic iodonium salt, an aromatic sulfonium salt, an aromatic phosphonium salt, a mixed ligand metal salt, or the like. The photocationic polymerization initiator may be a mixture of a photoradical polymerization initiator and a photocationic polymerization initiator as a hybrid material. The photocationic polymerization initiator may be an aromatic iodonium salt, an aromatic sulfonium salt, or the like having a function of initiating both of these polymerizations with one initiator.

The content of the radiation-curable resin and the photopolymerization initiator can be in the range of 0.1 mass % or more and 15 mass % or less. The resin composition may further contain a sensitizing dye in combination with the photopolymerization initiator. Further, dyes, pigments, various additives (polymerization inhibitors, leveling agents, defoaming agents, anti-sagging agents, adhesion enhancers, coating surface modifiers, plasticizers, nitrogen-containing compounds, etc.), crosslinking agents (e.g., epoxy resins), and the like may also be included as necessary, and, non-reactive resins (including the above-mentioned thermoplastic resins and thermosetting resins) may also be added in order to improve moldability.

In addition, materials can be selected in consideration of having a certain fluidity that enables molding by the production method to be applied, and obtaining a coating having desired thermal stability and chemical resistance.

<Protective Layer 6>

The protective layer 6 is a layer that protects the asperities of the micro concavo-convex structure layer 4.

The protective layer 6 is made of a gas such as air or a solid. When the protective layer 6 is made of a solid, a thermoplastic resin, an ultraviolet curable resin, or an electron beam curable resin which are the same as those constituting the micro concavo-convex structure layer can be used. The protective layer 6 can be formed of a hollow layer in which a gas is sealed. That is, the protective layer 6 can be made of a gas.

When a refractive index of the protective layer 6 is n1, and a refractive index of the micro concavo-convex structure layer is n2, the refractive index difference can be classified into three cases as follows.

n1<n2 (the refractive index difference is 0.2 or more)

Since the micro concavo-convex structure layer 4 serves as a reflective layer due to the refractive index difference, reflection occurs at the interface between the protective layer 6 and the micro concavo-convex structure layer 4. In this case, a color layer is observed due to light reflected by the interface.

n1=n2 (the refractive index difference is 0.2 or less)

When there is no refractive index difference between layers, light is transmitted regardless of the incidence angle. Accordingly, the image to be observed is determined by the angles α and β of the micro concavo-convex structure layer and a refractive index of a visual effect imparting layer.

n1>n2 (the refractive index difference is 0.2 or more)

In the case where light is incident from a high refractive layer to a low refractive layer, light is totally reflected when the incidence angle is equal to or larger than the critical angle. When light is totally reflected, the color of the color layer is observed. When light passes through the micro concavo-convex structure layer at the critical angle or less, the color layer is observed according to the refractive index of the visual effect imparting layer.

The refractive index of the protective layer can be appropriately selected depending on the intended effect in consideration of the inclination angle of the micro concavo-convex structure layer and the refractive index of the visual effect imparting layer. The protective layer may be made of an inorganic material, an organic material, or an organic-inorganic composite material. These materials have an adjustable refractive index. Further, the refractive index of the refractive layer can be adjusted by adding inorganic fine particles, organic fine particles, organic-inorganic composite fine particles, and hollow particles to an organic material such as the above-mentioned thermoplastic resin or ultraviolet curable resin. In this case, a functional group can be provided on the surface of the fine particles to improve dispersibility and film strength. Further, a dispersant or a surfactant may be added to improve dispersibility of the fine particles, or a crosslinking agent may be added to improve film strength.

<Substrate Layer 5>

The substrate layer 5 may be made of the same material as that of the micro concavo-convex structure layer 4. Alternatively, the substrate layer 5 may be integrally formed with the micro concavo-convex structure layer 4. The substrate layer 5 may be a plastic film. The material for the plastic film may be a thermoplastic polymer. The thermoplastic polymer may be PET or PP.

<Color Layer 7>

In the present embodiment, as shown in FIGS. 2 and 3, the color layer 7 is provided on the second surface 4Ab of the microstructure 4A positioned in the region 2. The display can be colored by the color layer 7.

The color layer 7 of the present embodiment can be formed by printing ink. The ink may be visible ink or invisible ink. The visible ink may be pigment ink or dye ink. The visible ink may be optically variable ink. The optically variable ink may be magnetic ink having magnetism. The optically variable ink may be pearl ink having a light interference function. The invisible ink may be ultraviolet absorbing ink, infrared absorbing ink, or fluorescent ink. The ink that can be applied to the color layer 7 is not limited to those described above, and can be ink that can be generally printed. Printing may be gravure printing, offset printing, offset gravure printing, or screen printing. In addition, other general printing can also be applied. Further, the color layer 7 can also be formed by coating with a resin. The coating may be gravure coating, micro gravure coating, or die coating. The resin to be coated may be thermosetting resin, ultraviolet curable resin, electron beam curable resin, or thermoplastic resin. The resin may be acrylic resin, urethane resin, or urethane acrylic resin. In addition to printing and coating, the color layer 7 can also be provided by casting, resin extrusion, laminating or the like.

The color layer 7 can be provided on the entirety or part of the second surface 4Ab. The color layer 7 can be provided on part of the second surface 4Ab by providing the color layer 7 on an upper part, a lower part, or a center part of the second surface 4Ab. When provided on an upper part, a lower part, or a center part of the second surface 4Ab, the color layer 7 can cover two-thirds of the entirety. In this case, the color layer 7 is preferably provided on 50% or more of the area of the second surface 4Ab. Further, the same second surface 4Ab can be coated with two or more color layers 7.

The color layer 7 is formed of a thin film having a thickness, for example, in the range of 0.5 μm or more and 1 μm or less. Accordingly, when viewed in the film thickness direction of the color layer 7, the color layer 7 cannot been seen. Further, a gap with a width of the film thickness of the color layer 7 may be provided between the adjacent microstructures 4A or may not be provided. In addition, the horizontal dimension of the microstructure 4A on which the color layer 7 is provided can be reduced by the film thickness of the color layer 7.

(Material for Color Layer 7)

The material for the color layer 7 may be ink, metal, or resin. The ink for the color layer 7 may be visible ink or invisible ink. The visible ink may be pigment ink or dye ink. The invisible ink may be ultraviolet absorbing ink, infrared absorbing ink, or fluorescent ink. When the color layer 7 provided in the region 2 is made of infrared absorbing ink or ultraviolet absorbing ink, an image observed under infrared light or ultraviolet light can appear at a predetermined observation angle. Thus, due to the ink having an absorption wavelength in the range other than the visible range, a motif can be verified by using a detector or by visual inspection with a special light source. Further, the visible pigment ink may be optically variable ink. The optically variable ink may be pearl ink causing interference with visible light. The optically variable ink may also be magnetic ink having magnetism.

(Method of Forming Color Layer 7)

A method of providing the color layer 7 on the second surface 4Ab may be a method by which the color layer 7 is applied or deposited on the surface of the asperities of the micro concavo-convex structure layer 4, and then unrequired regions of the color layer 7 are removed by dry etching or wet etching.

The color layer 7 can be formed by printing ink. The printing may be gravure printing, offset printing, gravure offset printing, or screen printing. The color layer 7 can be formed by coating with a resin. The coating may be gravure coating or die coating. Further, in addition to printing and coating, a visual effect imparting layer 8 can also be provided by casting, resin extrusion, laminating or the like.

When the color layer 7 is a reflective layer, the color layer 7 may be a metal layer. In this case, the color layer 7, that is, the metal layer may be formed by vapor deposition or sputtering. The metal of the metal layer may be a single metal or a metal compound. The metal of the metal layer may be Al, Sn, Cr, Ni, Cu, Ag, or an alloy thereof. Further, the reflective layer is not limited to the metal layer, and may be formed by applying a reflective ink.

Dry etching may be reactive laser beam etching, reactive gas etching, reactive ion etching, reactive ion beam etching, or ion beam etching. Wet etching may be an etching method of removing an unnecessary portion by a chemical treatment. Further, the color layer 7 can be provided only on one of the inclined surfaces by partially exposing the ultraviolet curable resin or electron beam curable resin as a resin for the color layer 7 to remove unnecessary portions and leave necessary portions.

(Effect of Color Layer 7)

In the microstructure 4A, the first surface 4Aa transmits light, whereas the second surface 4Ab on which the color layer 7 is provided causes at least one of reflection, scattering, diffraction, interference, and absorption, in other words, one of these optical phenomena or a plurality of these optical phenomena. The color layer 7 is not limited to being formed of a thin film, but may also be formed by roughening the second surface 4Ab. In this case, the color layer 7 appears whitish.

Figure 4C:
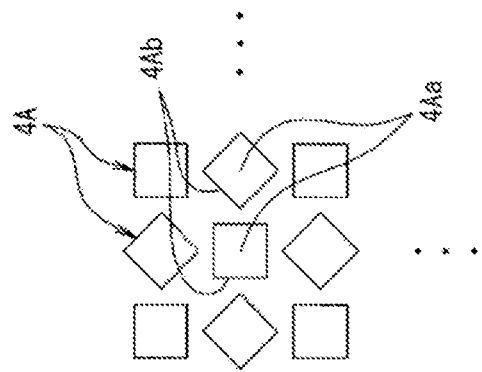
Figure 5:
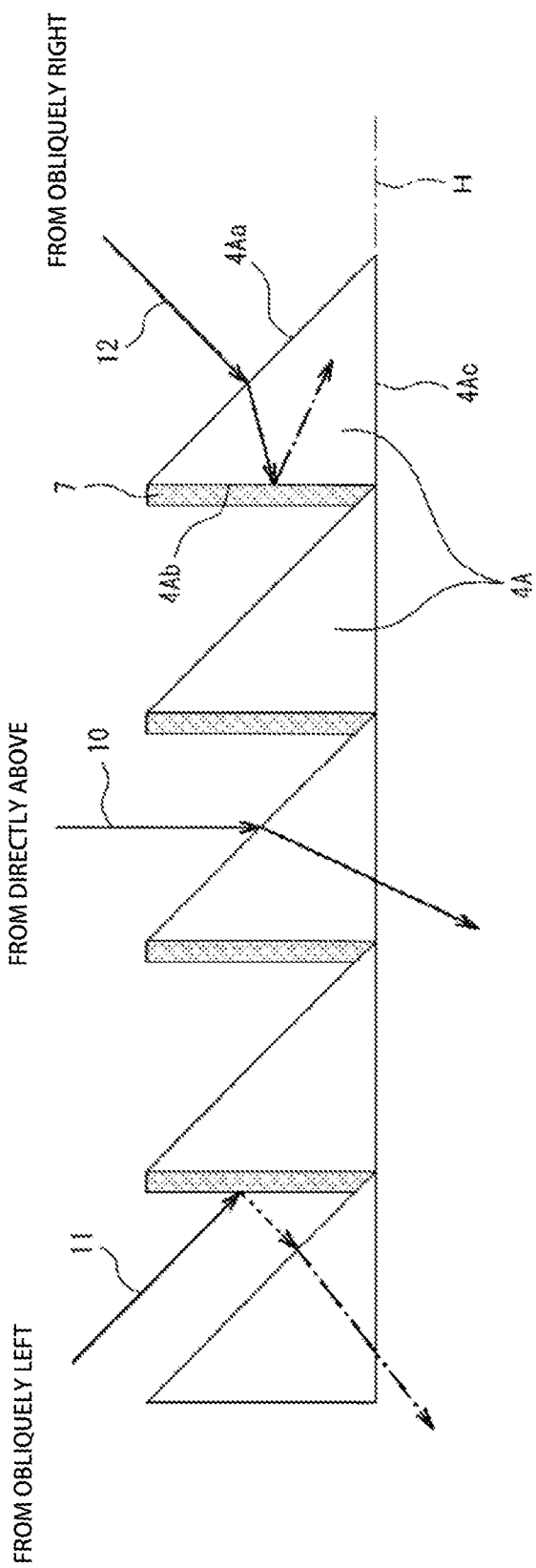
FIG. 5 is a cross-sectional view illustrating an optical path according to the first embodiment.

Further, by setting the inclination angle α of the second surface 4Ab to 90 degrees or around 90 degrees, the display 1 looks as if there is no color layer 7 when viewed from directly above the display 1 in an optical path 10 shown in FIG. 5 since light is transmitted and the color layer 7 is thin. On the other hand, when the display 1 is observed in a direction inclined left or right relative to the second surface 4Ab as optical paths 11 and 12 shown in FIG. 5, the appearance of the display varies depending on the optical function of the color layer 7. That is, the appearance of the color layer 7 varies depending on the observation direction. It should be noted that the observation direction described herein can refer to both an observation direction from the same side as light source and an observation direction from an opposite side to the light source. In addition, both the front surface and the rear surface of the display can be observed. The observation direction can be a direction with respect to a normal vector of the display, that is, a direction parallel to the normal vector, a direction perpendicular to the front of the display, and a direction not parallel to the normal vector, in other words, an oblique direction. Further, the observation direction can be rephrased as a display direction. The phrase "the display is observed" can be rephrased as "displayed by the display." In the present embodiment, the inclined surfaces on which the color layer 7 is provided are oriented in the same direction. However, as shown in FIG. 4(c), the second surfaces 4Ab can be oriented in different directions so that the color layers 7 appear differently depending on the direction in which the second surfaces 4Ab are oriented.

The detailed effects of the color layer 7 will now be described below.

Figure 6A:
FIGS. 6(a), 6(b), 6(c), 6(d), 6(e), and 6(f) are views illustrating a relationship between an observation direction and a visual effect according to the first embodiment.
Figure 6B:
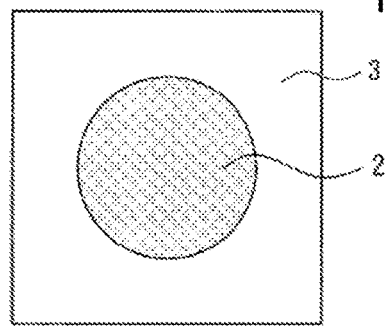

Specifically, as shown in FIG. 6(a), under the condition where the display 1 is obliquely observed in a direction directly facing the second surfaces 4Ab, that is, the color layers 7 (also referred to as a left side), the color layers 7 on the second surfaces 4Ab in the region 2 can be seen as shown in FIG. 6(b). When the color layers 7 in the region 2 are disposed in a specific arrangement, the display shows a motif according to the arrangement of the color layers 7. The observer can observe the motif displayed. In other words, the motif is visible. The displayed motif can include information recorded therein. The recorded information may be authentication information, identification information, or individual information. The information may be text, marks, symbols, signals, or signs. The symbol may be national flags, shields, swords, spears, armor, flowers, leaves, plants, birds, tropical fish, insects, or animals. In plan view facing the display surface 1S, the outline of an image 31 is substantially the same as the outline of the motif that arises the image 31. Accordingly, information can be read from the image exhibited by the motif.

Figure 6C:
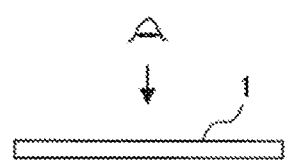
Figure 6D:
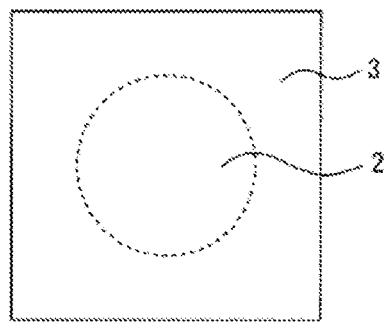

Further, as shown in FIG. 6(c), under the condition where the display 1 is observed from directly above, the color surfaces of the color layers 7 on the second surfaces 4Ab are not seen, and light passes through the micro concavo-convex structure layer. Accordingly, the motif by the color layers 7 is not observed as shown in FIG. 6(d). Thus, the display does not display a motif by the color layers 7 under this condition.

Figure 6E:
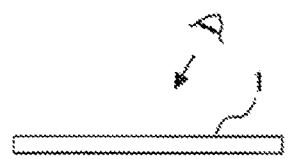
Figure 6F:
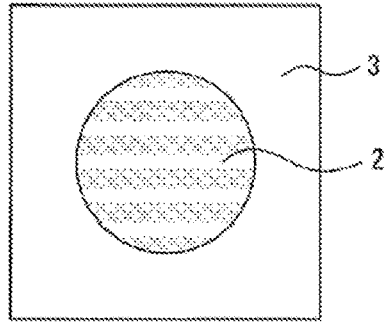

In addition, as shown in FIG. 6(e), under the condition where the display 1 is obliquely observed in a direction directly facing the first surfaces 4Aa (also referred to as a right side), the color layers 7 on the second surfaces 4Ab in the region 2 can be seen as shown in FIG. 6(f). However, since the rear surfaces of the color layers 7 are seen via the microstructures 4A as shown in FIG. 5, the color layers 7 appear differently from when observed under the condition where the display 1 is obliquely observed in a direction directly facing the second surfaces 4Ab, that is, the color layers 7. Since the color layers 7 provided on the inclined surfaces are partially seen through the micro concavo-convex structure layer, a stripe shaped motif can be seen as shown in FIG. 6(f).

(When Color Layer 7 is Reflective Layer)

Next, effects of the color layer 7 when provided as a reflective layer made of a metal layer or the like will now be described below.

As shown in FIG. 5, since the optical path in an oblique direction directly facing the second surfaces 4Ab, that is, the color layers 7, is reflected by the color layer 7 and directed downward through the bottom, an object placed under the display 1 is seen while the color layer 7 is not observed. When viewed from directly above, an object placed under the display 1 is seen while the color layer 7 is not observed. When the display 1 is obliquely observed in a direction directly facing the first surface 4Aa, the optical path is reflected by the rear surface of the color layer 7 and directed downward through the bottom. Accordingly, an object placed under the display 1 is seen while the color layer 7 is not observed.

As described above, when the color layer 7 is a reflective layer, an object placed under the display 1 is seen with or without occurrence of reflection by the color layer 7. However, as described later, when the visual effect imparting layer 8 such as a print layer underlies the micro concavo-convex structure layer 4, the appearance of the visual effect imparting layer 8 varies depending on the observation angle.

Second Embodiment

Next, a second embodiment will be described with reference to the drawings.

As shown in FIG. 7, the present embodiment differs from the first embodiment in that the visual effect imparting layer 8 underlies the micro concavo-convex structure layer 4. Since the configuration is the same as that of the first embodiment except that the visual effect imparting layer 8 is provided, the description will be focused on the visual effect imparting layer 8. Although the substrate layer 5 is omitted in the drawings for the second embodiment, the substrate layer 5 may be provided.

<Visual Effect Imparting Layer 8>

The visual effect imparting layer 8 is provided on the reference surface H of the micro concavo-convex structure layer 4. The visual effect imparting layer 8 is composed of any of a print layer, a reflective layer, a layer having a refractive index different from that of the micro concavo-convex structure layer 4, or a combination thereof. That is, the visual effect imparting layer 8 is composed of a print layer, a reflective layer, a layer having a different refractive index, or a multilayer in which two or more of these layers are combined. The multilayered visual effect imparting layer 8 can be composed of a combination of a layer having a different refractive index and a print layer, a combination of a layer having a different refractive index and a reflective layer, or a combination of layers having different refractive indices. The same applies to the two-layered visual effect imparting layer 8.

(When Visual Effect Imparting Layer 8 is Print Layer)

The visual effect imparting layer 8 can be a print layer. The print layer can be formed by printing ink. The ink may be visible ink or invisible ink. The visible ink may be pigment ink or dye ink. The visible ink may be optically variable ink. The pigment ink may be magnetic ink having magnetism. The optically variable ink may be pearl ink having a light interference function. The invisible ink may be ultraviolet absorbing ink, infrared absorbing ink, or fluorescent ink. The ink that can be applied to the visual effect imparting layer 8 is not limited to those described above, and can be ink that can be generally printed. Printing may be gravure printing, offset printing, offset gravure printing, or screen printing. In addition, other general printing can also be applied. Further, the visual effect imparting layer 8 can also be formed by coating with a resin. The coating may be gravure coating, micro gravure coating, or die coating. The resin to be coated may be thermosetting resin, ultraviolet curable resin, electron beam curable resin, or thermoplastic resin. The resin may be acrylic resin, urethane resin, or urethane acrylic resin. In addition to printing and coating, a visual effect imparting layer 8 can also be provided by casting, resin extrusion, laminating or the like.

(when Visual Effect Imparting Layer 8 is Reflective Layer)

The visual effect imparting layer 8 can be a reflective layer. The reflective layer reflects visible light. In particular, the reflective layer reflects visible light by specular reflection. The reflective layer can be a metal layer. The reflective layer can be formed by deposition. The deposition may be physical deposition, chemical deposition, or both. The physical deposition may be vapor deposition or sputtering. The materials for the metal layer may be a single metal material or an alloy thereof. The metal may be Al, Sn, Cr, Ni, Cu, or Ag. Further, the reflective layer is not limited to being a metal layer, and may be formed by applying or printing a reflective ink.

(When Visual Effect Imparting Layer 8 is Layer Having Different Refractive Index)

The layer having a refractive index different from that of the micro concavo-convex structure layer 4 (hereinafter, simply referred to as a refraction layer) may be a layer that totally reflects at the interface between the micro concavo-convex structure layer 4 and the visual effect imparting layer 8. Since the refraction layer is a layer that totally reflects at the interface between the micro concavo-convex structure layer 4 and the visual effect imparting layer 8, a material having a refractive index lower than that of the micro concavo-convex structure layer 4 can be used. Since the layer that totally reflects can enhance reflection, the optical effect of the display can be enhanced. The material for the refraction layer may be an inorganic material, an organic material, or an organic-inorganic composite material. Further, the refraction layer can be made of an organic material, and the refractive index can be adjusted by adding inorganic fine particles, organic fine particles, organic-inorganic composite fine particles, and hollow particles to an organic material. In this case, a functional group can be provided on the surface of the fine particles to improve dispersibility and film strength. Further, a dispersant or a surfactant may be added to improve dispersibility of the fine particles, or a crosslinking agent may be added to improve film strength. The refraction layer can be provided by providing the above-mentioned print layer under the refraction layer.

Alternatively, the micro concavo-convex structure layer 4 can also be made of a material having a higher refractive index than the visual effect imparting layer 8. In adjustment of the refractive index of the micro concavo-convex structure layer 4, materials such as an inorganic material, an organic material, or an organic-inorganic composite material can be used. Further, the micro concavo-convex structure layer 4 may be made of an organic material. The refractive index can be adjusted by adding inorganic fine particles, organic fine particles, organic-inorganic composite fine particles, and hollow particles to an organic material. In this case, a functional group can be provided on the surface of the fine particles to improve dispersibility and film strength. Further, a dispersant or a surfactant may be added to improve dispersibility of the fine particles, or a crosslinking agent may be added to improve film strength.

(Effect of Visual Effect Imparting Layer 8)

Next, effects of case where the visual effect imparting layer 8 is provided will now be described below.

Figure 8A:
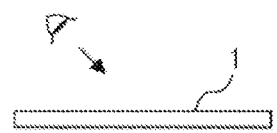
FIGS. 8(a), 8(b), 8(c), 8(d), 8(e), and 8(f) are views illustrating a relationship between an observation direction and a visual effect according to the second embodiment.
Figure 8B:
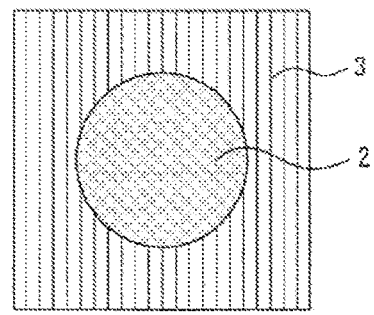

As shown in FIG. 8(a), when the display 1 is obliquely observed in a direction directly facing the second surfaces 4Ab, that is, the color layers 7, the color layers 7 on the second surfaces 4Ab in the region 2 can be seen and the visual effect imparting layer 8 can be seen via the micro concavo-convex structure layer 4 in the region 3 as shown in FIG. 8(b). Further, when the color layers 7 in the region 2 are disposed in a specific arrangement, the display can form a motif according to the arrangement of the color layers 7. The display can exhibit an image of the motif. That is, the observer can observe the displayed motif. In other words, the motif is visible. The motif can include information recorded therein. The recorded information may be authentication information, identification information, or individual information. The information may be text, marks, symbols, signals, or signs. The symbol may be national flags, shields, swords, spears, armor, flowers, leaves, plants, birds, tropical fish, insects, or animals. In plan view facing the display surface 1S, the outline of an image 31 is substantially the same as the outline of the motif that arises the image 31. Accordingly, information can be read from the image exhibited by the motif.

Figure 8C:
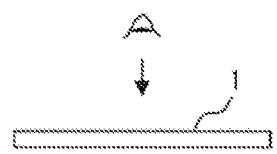
Figure 8D:
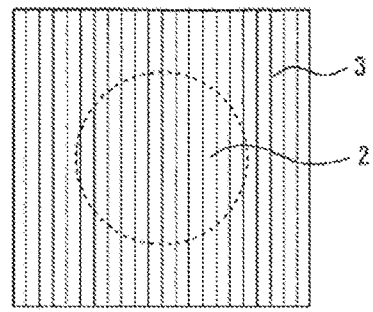

Further, as shown in FIG. 8(c), when the display 1 is observed from directly above, the color surfaces of the color layers 7 on the second surfaces 4Ab are not seen, and light passes through the micro concavo-convex structure layer. Accordingly, the visual effect imparting layer 8 that underlies the color layers 7 in the regions 2 and 3 can be seen as shown in FIG. 8(d).

Figure 8E:
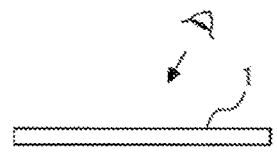
Figure 8F:
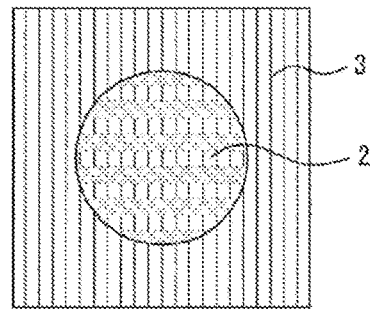

In addition, as shown in FIG. 8(e), under the condition where the display 1 is obliquely observed in a direction directly facing the first surfaces 4Aa, the color layers 7 on the second surfaces 4Ab in the region 2 can be seen as shown in FIG. 8(f). However, since the rear surfaces of the color layers 7 are seen via the microstructures 4A, the color layers 7 appear differently from the case where the display 1 is obliquely observed in a direction directly facing the second surfaces 4Ab, that is, the color layers 7. In other words, in the region 2, the color layers 7 provided on the inclined surfaces can be partially seen through the micro concavo-convex structure layer and the visual effect imparting layer 8 underlying the color layers 7 can also be partially seen.

(When Visual Effect Imparting Layer 8 is Formed of Reflective Layer)

Figure 9A:
FIGS. 9(a), 9(b), 9(c), 9(d), 9(e), and 9(f) are views illustrating a relationship between an observation direction and a visual effect according to the second embodiment.
Figure 9B:
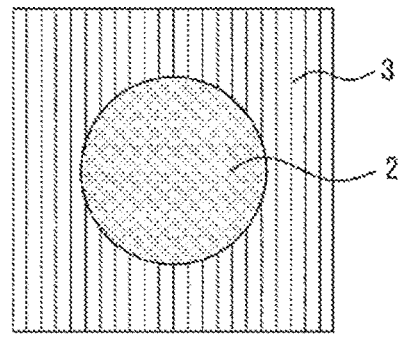
Figure 9C:
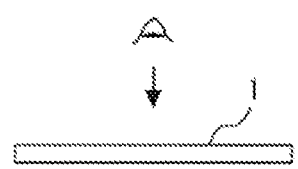
Figure 9D:
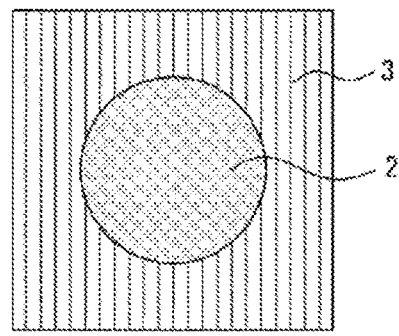
Figure 9E:
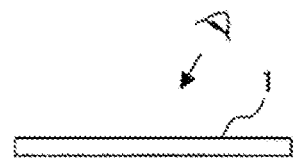
Figure 9F:
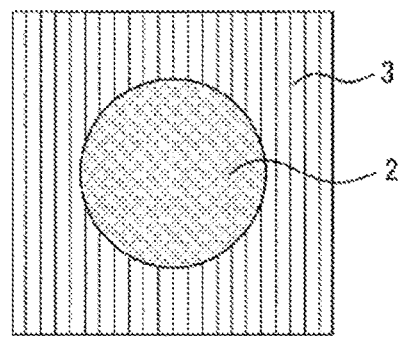

Specifically, in the case where the visual effect imparting layer 8 is formed of a reflective layer, the color layers 7 are observed in the region 2 as shown in FIGS. 9(b), 9(d), and 9(f), when observed in the direction shown in FIGS. 9(a), 9(c), and 9(e), respectively.

That is, under the condition where the display 1 is obliquely observed in a direction facing the second surfaces 4Ab on which the color layer 7 is provided, the incident light is reflected by the visual effect imparting layer 8 in the region 3. Under this condition, the color layers 7 can be seen in the region 2.

Further, under the condition where the display 1 is observed from directly above, the color layer 7 reflected on the reflective layer is observed in the region 2, whereas the reflective layer is observed in the region 3. In the region 2, as light entering from the above is refracted by the first surface 4Aa toward the second surface 4Ab and becomes an optical path incident on the micro concavo-convex structure layer, the color layer 7 reflected on the reflective layer can be seen (see FIG. 5).

Under the condition where the display 1 is obliquely observed in a direction facing the first surface 4Aa, only the color layers 7, which include the color layers 7 directly seen via the micro concavo-convex structure layer and the image of the color layers 7 reflected on the visual effect imparting layer 8, are observed in the region 2, whereas the reflective layer is observed in the region 3.

Thus, when the visual effect imparting layer 8 is a reflective layer, the color of the color layer 7 can be seen in the region 2 in any observation direction.

(when Visual Effect Imparting Layer 8 is Formed of Refraction Layer and Refractive Index of Micro Concavo-Convex Structure Layer 4 Satisfies Visual Effect Imparting Layer 8<Micro Concavo-Convex Structure Layer 4)

When the refractive index of the visual effect imparting layer 8 is smaller than that of the micro concavo-convex structure layer 4, and an incidence angle from the micro concavo-convex structure layer 4 toward the visual effect imparting layer 8 is equal to or larger than a critical angle, total reflection occurs at the interface therebetween.

Figure 10:
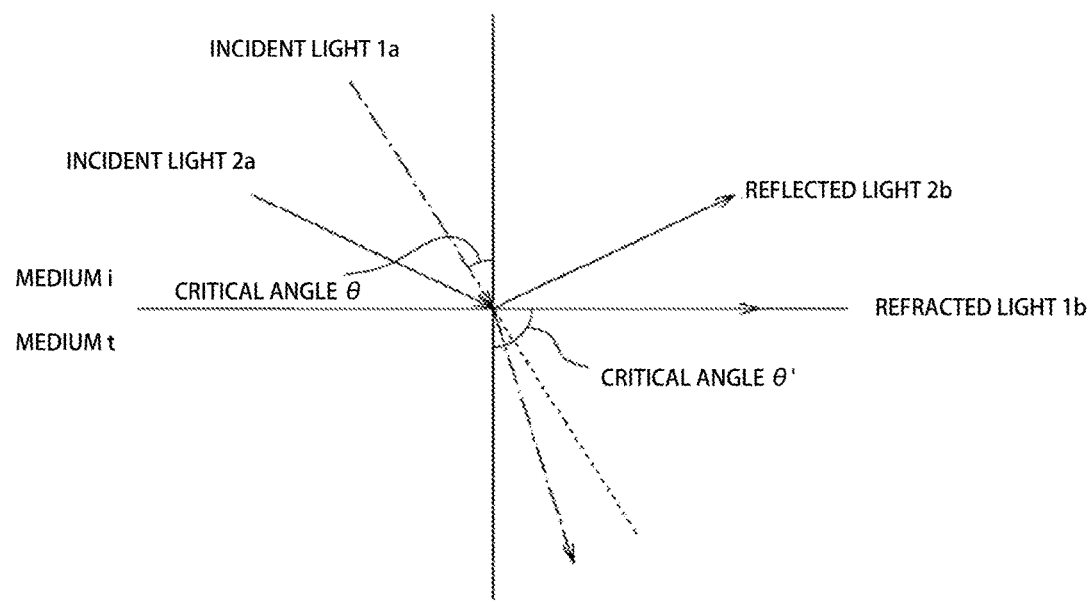
FIG. 10 is a view illustrating a critical angle.
Figure 11:
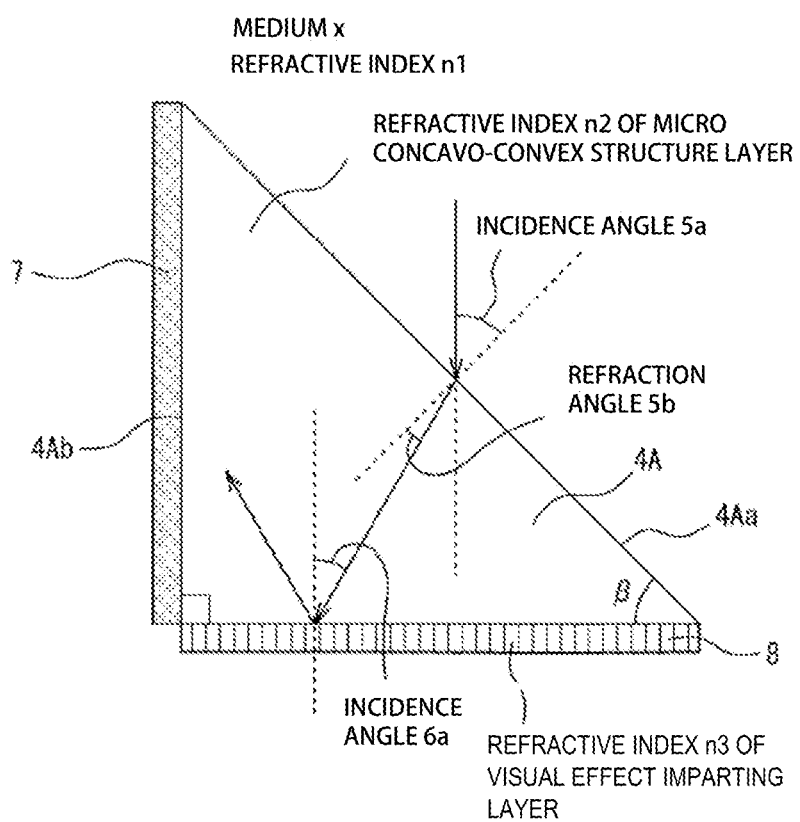
FIG. 11 is a schematic view of an optical path in a microstructure.
Figure 12A:
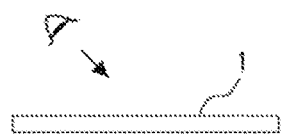
FIGS. 12(a), 12(b), 12(c), 12(d), 12(e), 12(f), 12(g), and 12(h) are views illustrating a relationship between an observation direction and a visual effect according to the second embodiment.
Figure 12B:
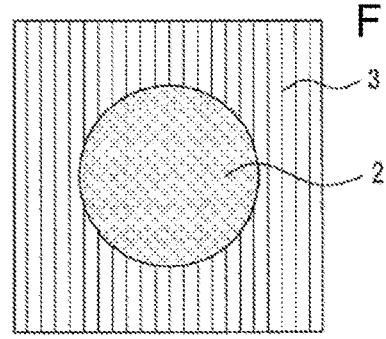
Figure 12C:
Figure 12D:
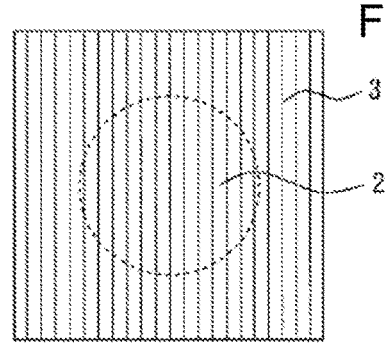
Figure 12E:
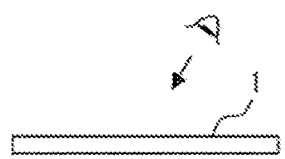
Figure 12F:
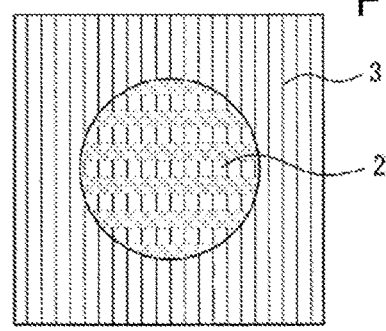
Figure 12G:
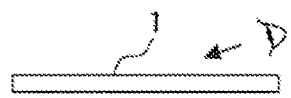
Figure 12H:
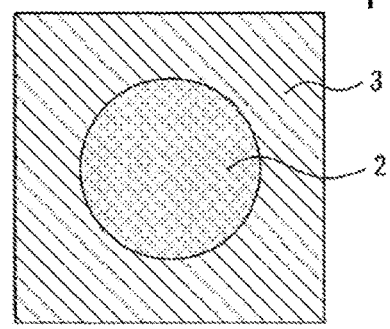

With reference to FIGS. 10 and 11, the total reflection will be described. FIG. 10 is a cross-sectional view illustrating a critical angle.

A medium i and a medium t have flat interfaces, and a refractive index of the medium i is $n_i$, and a refractive index of the medium t is $n_t$. A critical angle θ is obtained from equation (1) according to Snell's law and the refractive indices.

$$\sin\theta = n_t/n_i \quad (1)$$

As shown in FIG. 10, incident light 1a, which is incident at a critical angle θ, becomes refracted light 1b in a direction of the refraction angle θ'=90° (direction of the interface between the medium i and the medium t). Incident light 2a, which is incident at an angle larger than the critical angle θ, is totally reflected and becomes reflected light 2b.

Although not shown, incident light, which is incident at an angle smaller than the critical angle θ, is refracted at a refraction angle according to Snell's law and passes through the interface between the two media.

With reference to FIG. 11, a mechanism of total reflection at the interface between the micro concavo-convex structure layer 4 and the visual effect imparting layer 8 (low refractive layer) will be described. As described above, when light is incident from a material with high refractive index to a material with low refractive index, light is total reflected at the interface when the incidence angle is equal to or larger than the critical angle. The critical angle depends on the refractive index difference of the materials, and is derived from the equation (1). In order to light passing through the micro concavo-convex structure layer 4 and to be totally reflected by the interface to the visual effect imparting layer 8, the incidence angles 4a and 6a are required to be equal to or larger than the critical angle.

When the color layer 7 is provided on an inclined surface that forms an angle of 90 degrees between the inclined surface and the bottom 4Ac of the micro concavo-convex structure layer 4, the incidence angle 6a to the interface between the micro concavo-convex structure layer 4 and the visual effect imparting layer 8 can be obtained by equation (2).

$$\text{(Incidence angle } 6a) = \beta - \text{(refraction angle } 5b) \quad (2)$$

When the incidence angle 6a becomes the critical angle, equation (3) is established according to Snell's law and the definition of the refractive indices.

$$\sin(\alpha - 5b) = n3/n2 \quad (3)$$

Further, for the light entering from outside to the inside of the micro concavo-convex structure layer, equation (4) is established according to Snell's law.

$$n1 \cdot \sin 5a = n2 \cdot \sin 5b \quad (4)$$

In definition of the incidence angle 5a on the micro concavo-convex structure layer 4 based on the equation (3) and the equation (4), the critical angle at which total reflection occurs at the interface between the micro concavo-convex structure layer 4 and the visual effect imparting layer 8 varies depending on the angle $\alpha$ formed by the inclined surface of the micro concavo-convex structure layer 4.

As shown in FIG. 12(*a*), under the condition where the display 1 is obliquely observed in a direction facing the second surface 4Ab on which the color layer 7 is provided, the visual effect imparting layer 8 in the region 3 transmits light, and the color layers 7 can be seen in the region 2. Accordingly, as shown in FIG. 12(*b*), an image of the motif appears on the display, and the display shows the motif. As shown in FIG. 12(*c*), under the condition where the display 1 is observed from directly above, light passes through the micro concavo-convex structure layer 4 in the regions 2 and 3, and the visual effect imparting layer 8 can be seen. Accordingly, as shown in FIG. 12(*d*), an image of the motif on the display disappears.

As shown in FIGS. 12(*e*) and 12(*g*), under the condition where the display 1 is obliquely observed in a direction facing the first surface 4Aa, total reflection occurs when the critical angle depends on the refractive indices of the micro concavo-convex structure layer 4 and the visual effect imparting layer 8 as described above. When total reflection does not occur since the incidence angle of light is equal to or smaller than the critical angle under the condition shown in FIG. 12(*e*), light incident on the inclined surface of the micro structure is transmitted, and the visual effect imparting layer 8 is observed in the region 3. In the region 2, the color layers 7 provided on the second surfaces 4Ab are partially seen, and an image of the motif is observed as shown in FIG. 12(*f*). That is, the image of the motif appears. In other words, the display shows the motif. On the other hand, under the observation condition where total reflection occurs as shown in FIG. 12(*g*), the color layers 7 causes reflection at the interface to the visual effect imparting layer 8 in the region 2, and total reflection occurs in the region 3. Accordingly, as shown in FIG. 12(*h*), an image of the motif appears on the display, and the display shows the motif.

Since a layer having a different refractive index is provided as the visual effect imparting layer 8, when the display is observed in a direction facing the side on which the color layer 7 is not provided, whether or not the color layers 7 are observed is determined depending on the observation angle. Accordingly, the display can exhibit different images depending on the observation angle.

The visual effect imparting layer 8 may also be an absorption layer that absorbs visible light of a predetermined wavelength range.

Third Embodiment

Next, a third embodiment will be described with reference to the drawings.

As shown in FIG. 13, the present embodiment differs from the second embodiment in that a concealing layer 9 is provided on the color layer 7. Since the configuration is the same as that of the second embodiment except that the concealing layer is provided, the description will be focused on the concealing layer 9. Although the substrate layer 5 is omitted in FIG. 13, the substrate layer 5 may be provided. In addition, a visual effect color imparting layer may also be omitted.

<Concealing Layer 9>

A concealing layer 9 is formed on the color layer 7 on the microstructure 4A. The concealing layer 9 may be formed to cover all or part of each color layer 7. When the concealing layer 9 covers only part of the color layer 7, at least half of the color layer 7, that is, 50% or more of the color layer 7 can be covered. Thus, the concealing layer 9 can conceal the color layer. Concealment can be achieved even by partial concealment as long as such concealment causes visual difference. The visual difference may be fading of the color layer 7. The fading may be a decrease in apparent saturation of the color layer 7.

The concealing layer 9 is provided to conceal the color of the color layer 7. The concealing layer 9 itself may be colored.

The concealing layer 9 can be made of the same material as that of the color layer 7 and the visual effect imparting layer 8, such as ink, and can be produced by the same method as that of the color layer 7. The ink for the concealing layer 9 may be an ink that absorbs light in the range other than the visible range, which makes it possible to verify an image by using a detector or by visual inspection with a special light source. The method for producing the concealing layer 9 is the same as that described earlier.

<Effect of Providing Concealing Layer 9>

The effect of providing the concealing layer 9 on a surface of the color layer 7 facing away from the micro concavo-convex structure layer 4 will now be described.

By providing the concealing layer 9, optical effects can be easily changed between the front surface and the rear surface of the color layer 7.

In particular, when the visual effect imparting layer 8 is composed of the reflective layer or the refraction layer described above, that is, when the color layer 7 is configured to be seen by reflection at a particular angle, it is effective to provide the concealing layer 9.

(When Visual Effect Imparting Layer 8 is Formed of Reflective Layer)

First, the case where the visual effect imparting layer 8 is a reflective layer will be described.

Figure 14A:
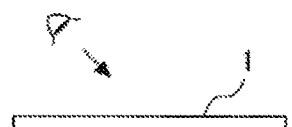
FIGS. 14(a), 14(b), 14(c), 14(d), 14(e), and 14(f) are views illustrating a relationship between an observation direction and a visual effect according to the third embodiment.
Figure 14B:
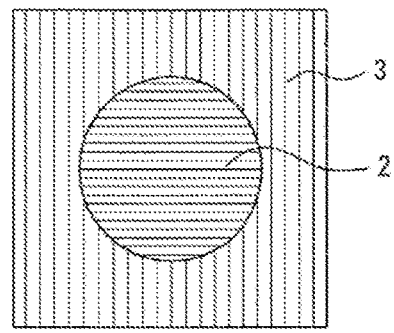

As shown in FIG. 14(a), when the display 1 is observed in a direction facing the second surface 4Ab, the concealing layers 9 are observed in the region 2. Accordingly, as shown in FIG. 14(b), the motif is displayed. That is, the image of the motif appears. Thus, the motif is observed.

Figure 14C:
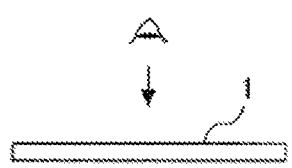
Figure 14D:
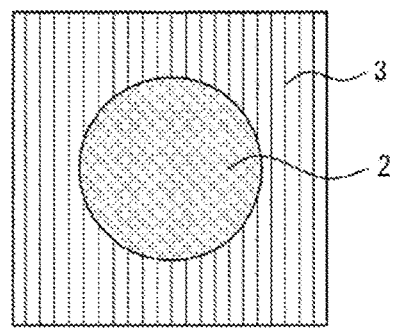
Figure 14E:
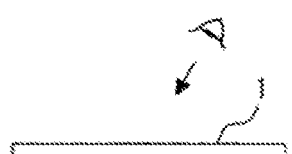
Figure 14F:
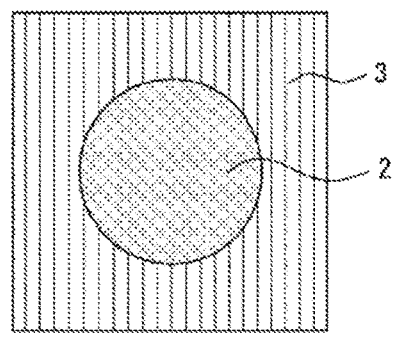

On the other hand, as shown in FIGS. 14(c) and 14(e), when the display 1 is observed from directly above and in a direction facing the first surface 4Aa, respectively, the color layer 7 reflected by the visual effect imparting layer 8 is observed in the region 2, and the visual effect imparting layer 8 is observed in the region 3. Accordingly, as shown in FIGS. 14(d) and 14(f), the same motif is displayed. That is, the image of the motif appears. Thus, the motif is observed.

(When Visual Effect Imparting Layer 8 is Formed of Refraction Layer)

Next, the configuration in which the visual effect imparting layer 8 is a refraction layer will be described.

Since the critical angle depends on the refractive indices of the micro concavo-convex structure layer 4 and the visual effect imparting layer 8 as described above, total reflection occurs.

Figure 15A:
FIGS. 15(a), 15(b), 15(c), 15(d), 15(e), 15(f), 15(g), and 15(h) are views illustrating a relationship between an observation direction and a visual effect according to the third embodiment.
Figure 15B:
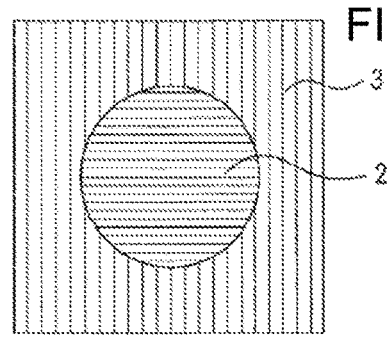

As shown in FIG. 15(a), under the condition where the display 1 is observed in a direction facing the second surface 4Ab, light passes through the visual effect imparting layer 8 in the region 3, and the color layer 7 can be seen in the region 2. Accordingly, as shown in FIG. 15(b), the motif is displayed. That is, the image of the motif appears. Thus, the motif is observed.

Figure 15C:
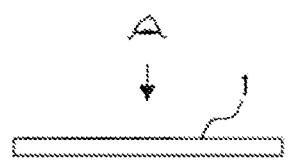
Figure 15D:
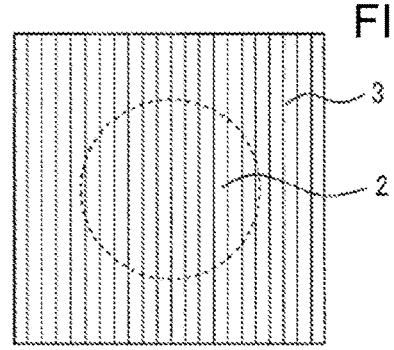

Further, as shown in FIG. 15(c), under the condition where the display 1 is observed from directly above, light passes through the micro concavo-convex structure layer 4 and the visual effect imparting layer 8 can be seen in both the regions 2 and 3. Accordingly, as shown in FIG. 15(d), the motif can be displayed by the visual effect imparting layer 8. That is, the image of the motif appears. Thus, the motif is observed.

Figure 15E:
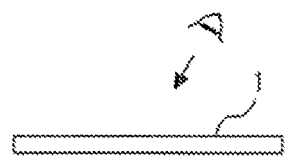
Figure 15F:
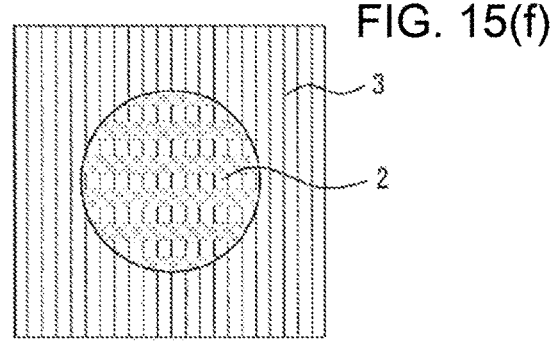
Figure 15G:

On the other hand, as shown in FIGS. 15(e) and 15(g), when the display 1 is obliquely observed in a direction facing the first surface 4Aa, the critical angle depends on the refractive indices of the micro concavo-convex structure layer 4 and the visual effect imparting layer 8 as described above. Therefore, total reflection occurs under the condition where the incidence angle is equal to or more than the critical angle. When total reflection does not occur since the incidence angle of light is equal to or smaller than the critical angle under the condition shown in FIG. 15(e), light incident on the inclined surface of the micro structure passes through the interface between the micro concavo-convex structure layer 4 and the visual effect imparting layer 8. Thus, the visual effect imparting layer 8 can be seen in the region 3, and the color layer 7 provided on the vertical surface can be partially seen in the region 2. As a result, as shown in FIG. 15(f), the motif is displayed by the visual effect imparting layer 8 in the region 3. That is, the image of the motif appears. Thus, the motif is observed.

Figure 15H:
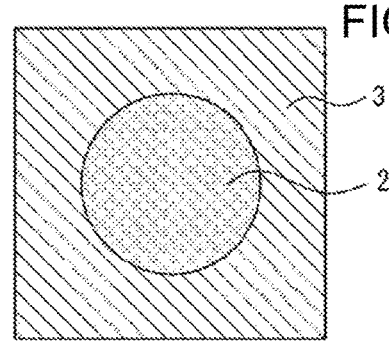

On the other hand, under the observation condition where total reflection occurs as shown in FIG. 15(g), the color layers 7 reflected by the interface to the visual effect imparting layer 8 are seen in the region 2, and total reflection is seen in the region 3. Accordingly, as shown in FIG. 15(h), the motif is displayed by total reflection in the region 3. That is, the image of the motif appears. Thus, the motif is observed.

As described above, due to the concealing layer 9, different colors can be displayed in the region 2 depending on the observation direction.

Further, by providing a refraction layer as the visual effect imparting layer 8, light transmission and color shift of the color layer 7 in observation at different angles can be achieved when the display is observed in the same direction. Accordingly, the color layer 7 and the concealing layer 9 can contribute to light transmission and color shift of two colors.

In addition, by providing the concealing layer 9, even when the visual effect imparting layer 8 is not provided, different colors can be observed between the conditions where the display is observed in a direction facing the color layers 7 and the concealing layers 9 of the micro structure and in a direction facing the bottom 4Ac of the micro concavo-convex structure layer 4.

Fourth Embodiment

The present embodiment is the same as the above embodiments in the basic configuration, but differs from the above embodiments in the configurations of the micro concavo-convex structure layer 4 (microstructure 4A) and the color layer 7. For other configurations, configurations of the first to third embodiments can be appropriately applied.

In the first embodiment, the respective microstructures 4A constituting the micro concavo-convex structure layer 4 are made of any of gas, liquid, or solid. When the microstructures 4A are made of thermoplastic resin, a resin used is one having a melting temperature (JIS k 7121) or softening temperature (JIS k 6863) higher than the ambient temperature range in which the display 1 is used.

Further, in the present embodiment, the microstructure 4A includes a plurality of magnetic particles 20, and these magnetic particles 20 migrate toward the second surface 4Ab to be accumulated on the second surface 4Ab to thereby form the color layer 7. The magnetic ink includes a plurality of magnetic particles 20.

The magnetic particles 20 are particles having property of being oriented by magnetic force and arranged along a line of magnetic force. The magnetic particles 20 are made of a magnetic metal. The magnetic particles 20 may be flake particles, spherical particles, or the like. The magnetic metal for the magnetic particles 20 may be nickel, iron oxide, or the like.

The surface of the magnetic particles 20 may be colored with ink. The size of the magnetic particles 20 is set to a size that can move in the microstructure 4A. The magnetic particle 20 may have a maximum diameter in the range of 0.1 μm or more and 6 μm or less. The maximum diameter can be measured with a microscope.

A method of producing the micro concavo-convex structure layer 4 (microstructure 4A) of the fourth embodiment will be described below.

A concavo-convex structure is formed on the structure constituting the protective layer 6 by a structure formation process such as nanoimprinting, embossing, or the like. The concavo-convex structure includes the plurality of microstructures 4A.

The recesses of the microstructures 4A are filled with any of a gas (such as air or inert gas) containing a plurality of magnetic particles 20, liquid (such as water) containing a plurality of magnetic particles 20, and a solid containing a plurality of magnetic particles 20, and then sealed with the substrate layer 5.

The solid that can be used for the microstructure may be an organic material, an inorganic material, or a mixture thereof. The organic material may be a thermoplastic resin, ultraviolet curable resin, electron beam curable resin, which are the same resins as those for the microstructure 4A.

Figure 17:
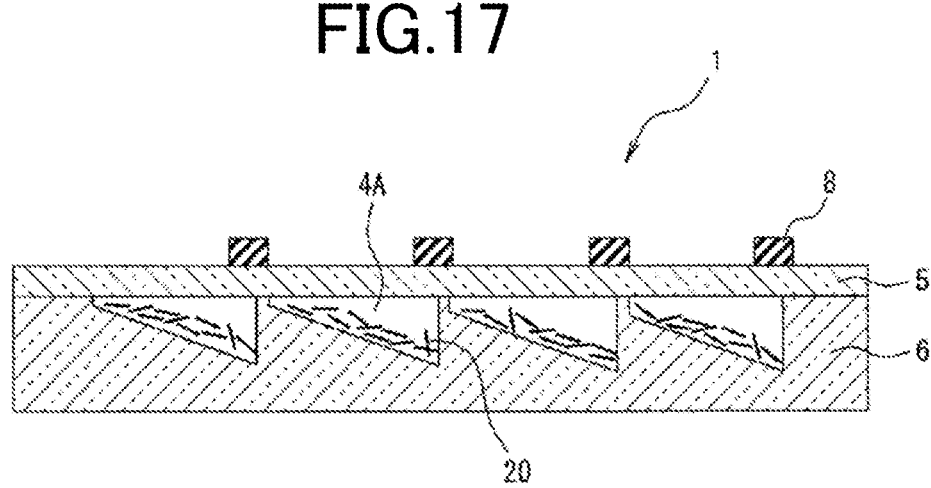
FIG. 17 is a view showing a state where magnetic particles are sealed.

As shown in FIG. 17, when the microstructures 4A are filled with any of liquid (such as water) containing a plurality of magnetic particles 20, and solids containing a plurality of magnetic particles 20, a plurality of magnetic particles 20 are dispersed in the microstructures 4A.

Figure 18:
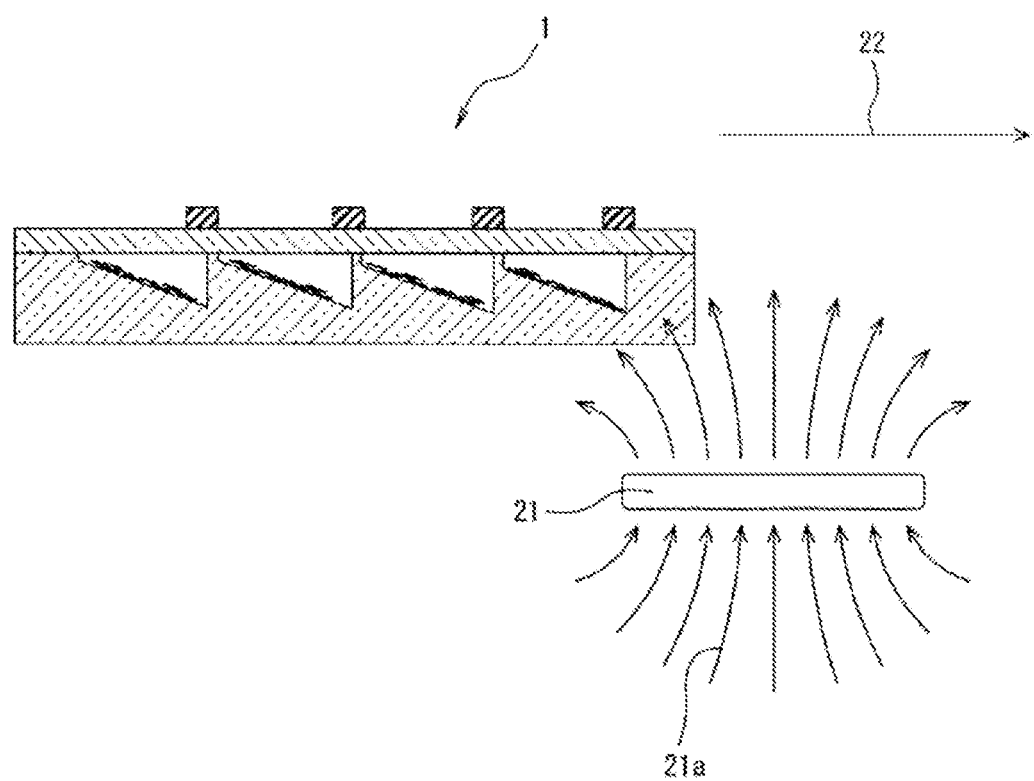
FIG. 18 illustrates a step of migrating the magnetic particles toward a second surface.

In the next step, as shown in FIG. 18, the display 1 is horizontally displaced above the magnet 21 relative to the magnet 21 when the main component of the microstructure 4A is gas or liquid. Alternatively, when the main component of the microstructure 4A is a thermoplastic resin, the displacement is performed after the thermoplastic resin is heated to a melting temperature (JIS K 7121) or a softening temperature (JIS K 6863) to obtain fluidity. Since the magnet generates lines of magnetic force, the magnetic particles 20, when displaced above the magnet relative to the magnet, are not only oriented along the lines of magnetic force, but also migrate along the first surface 4Aa to be accumulated on the second surface 4Ab to thereby form a color layer.

In the case where the magnetic particles 20 have a scale shape, the magnetic particles 20 rise along the line of magnetic force when located directly above the magnet, and then migrate toward the second surface 4Ab along the first surface 4Aa while being inclined toward the right due to the lines of magnetic force.

Thus, the color layer 7 is formed by the magnetic particles 20.

Since the magnetic particles 20 have a micrometer-order size, the magnetic particles 20 do not migrate when there is no act of magnetism even if the main component of the microstructure 4A is gas or liquid.

Figure 16:
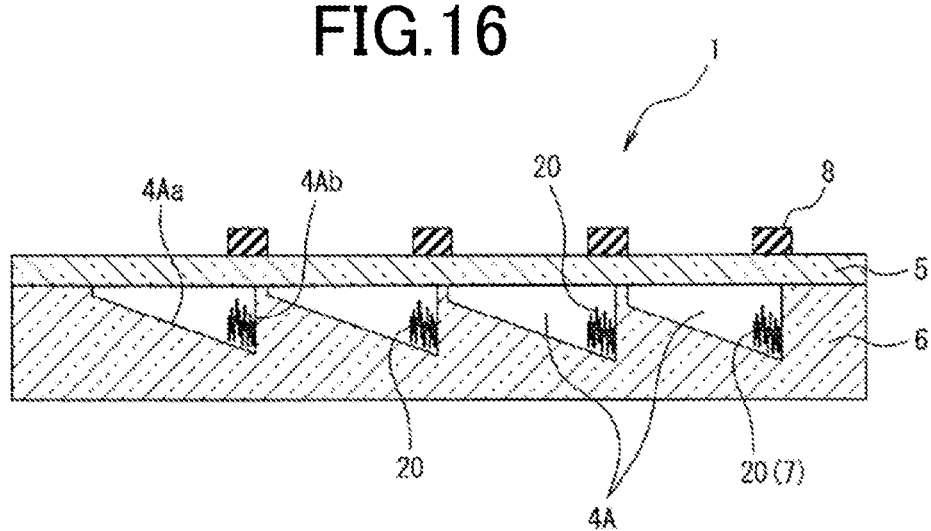
FIG. 16 is a cross-sectional view illustrating a display according to a fourth embodiment.

Although FIG. 16 shows that the visual effect imparting layer 8 is provided only at a position facing the magnetic particles 20, the visual effect imparting layer 8 can be provided on the entirety of the second surface 4Ab as in the second embodiment.

Alternatively, the visual effect imparting layer 8 may be provided instead of the substrate layer 5.

Further, instead of forming the color layer 7 from the magnetic particles 20, the color layer 7 made of a thin film as described above can also be provided on the inner surface of the second surface 4Ab.

Fifth Embodiment

The present embodiment is the same as the above embodiments in basic configuration, but differs from the above embodiments in that the functional layer provided on the first surface is an optically variable layer.

For configurations other than the optically variable layer, configurations of the first to fourth embodiments can be appropriately applied.

(Configuration and Effects of Display)

Figure 23:
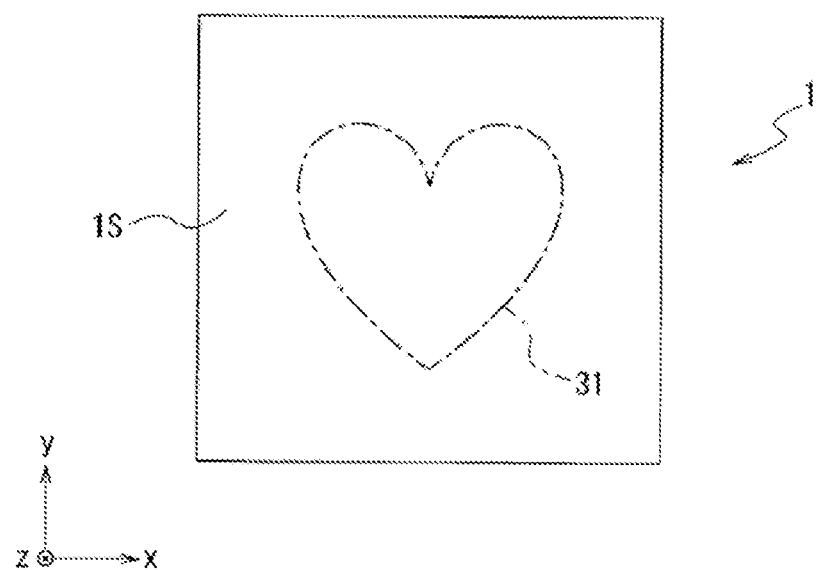
FIG. 23 is a plan view illustrating a planar structure of a display according to a fifth embodiment.

As shown in FIG. 23, the display 1 of the present embodiment includes the display surface 1S in which at least one image 31 can be seen at a specific observation angle.

In the display 1, the display surface 1S is a surface on which the image 31 is displayed. The image 31 displayed on the display surface 1S may be formed of one region, or may be formed of a group of a plurality of regions. The display surface 1S may be a flat surface or a curved surface.

In FIG. 23, in plan view facing the display surface 1S, the image 31 has a heart shape. The image may be an image exhibited by the motif. The shape of the image may be text, characters, marks, symbols, signals, signs, geometric shapes, or other objects. The symbol may be national flags, shields, swords, spears, armor, flowers, leaves, plants, birds, tropical fish, insects, or animals. In plan view facing the display surface 1S, the outline of an image 31 is substantially the same as the outline of the motif that arises the image 31. Accordingly, information can be read from the image exhibited by the motif.

An image forming layer that forms the image 31 is formed of the micro concavo-convex structure layer 4 in which the plurality of microstructures 4A are provided.

When the micro concavo-convex structure layer 4 has a configuration in which the microstructures 4A are continuously arranged side by side in one direction, the adjacent microstructures 4A share one side that partitions the structure.

Figure 24:
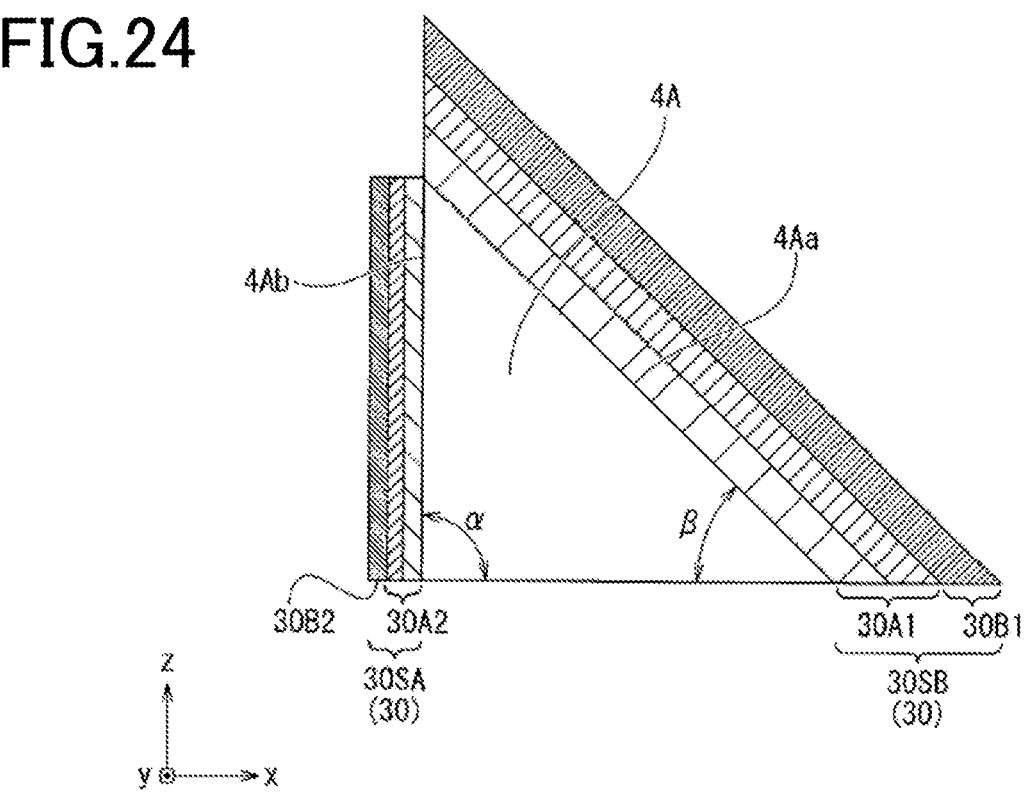
FIG. 24 is a cross-sectional view illustrating a structure of the fifth embodiment.

In the present embodiment, as shown in FIG. 24, an optically variable layer 30 is provided on the second surface 4Ab and the first surface 4Aa. The optically variable layer 30 may also be partially provided on the target surface. When partially provided, the optically variable layer 30 may account for 30% or more and 80% or less of the area of the target surface. The optically variable layer 30 is a layer that varies the wavelength range of the light reflected or the wavelength range of the light transmitted. This variation can be a shift depending on the angle formed between the direction of light incident on the optically variable layer and the normal vector of the optically variable layer. The optically variable layer 30 is composed of a multilayer of dielectric multilayers 30A1 and 30A2 and the metal reflective layers 30B1 and 30B2.

A second surface optically variable layer 30SA laminated on the second surface 4Ab and a first surface optically variable layer 30SB laminated on the first surface 4Aa preferably have a relationship in the layer thickness of 30SA<30SB.

In the above description, the optically variable layer 30 is composed of the dielectric multilayers 30A1 and 30A2, and the metal reflective layers 30B1 and 30B2 provided thereon. The optically variable layer 30 may further include a second dielectric multilayer provided on the metal reflective layers 30B1 and 30B2.

Further, the metal reflective layers that form the optically variable layer 30 can be configured such that the metal reflective layer 30B2 provided on the second surface 4Ab has an integrated transmittance in the visible light wavelength region higher than an integrated reflectance, and the metal reflective layer 30B1 provided on the first surface 4Aa has an integrated transmittance lower than an integrated reflectance. With this configuration, a good visual effect can be achieved.

Figure 25A:
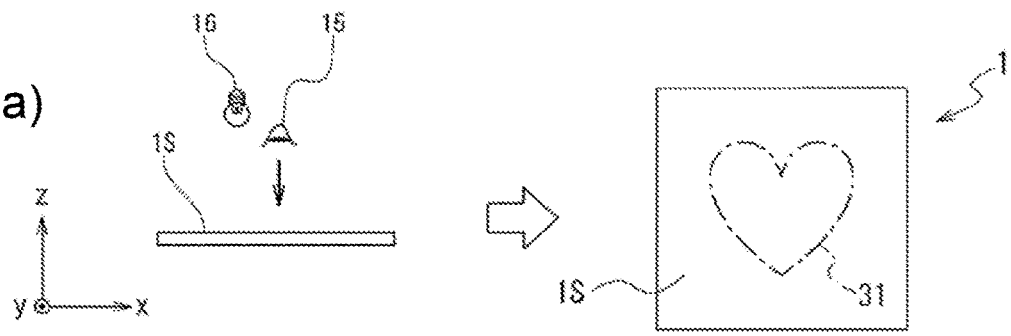
Figure 25B:
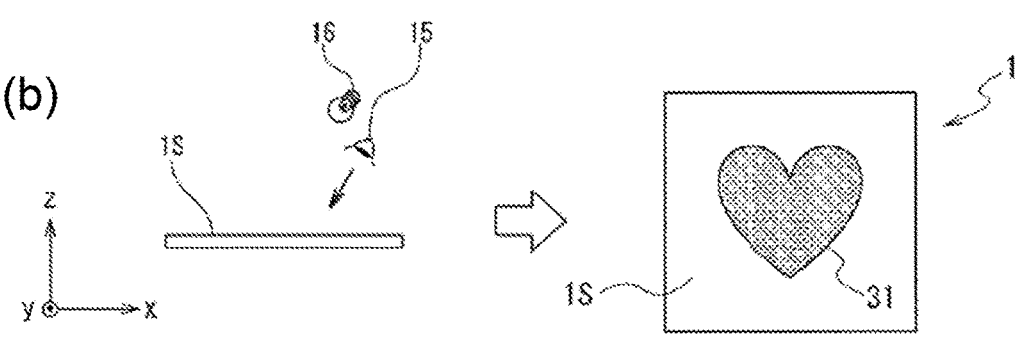
Figure 25C:
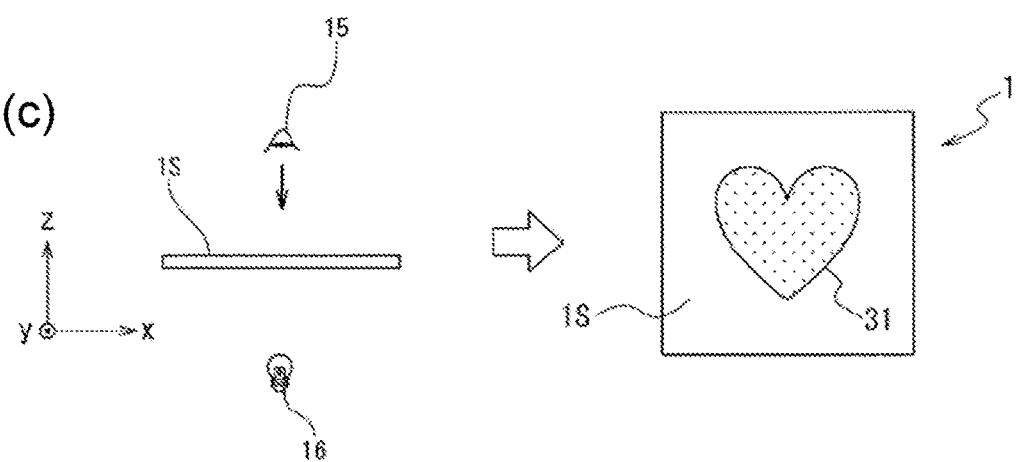

In the above configuration, when the optically variable layer 30 is formed by providing the dielectric multilayer layer and the metal reflective layer in this order on each of the second surface 4Ab and the first surface 4Aa, the motif can be displayed as shown in FIGS. 25(a) to 25(c). That is, the image of the motif appears. Thus, the motif is observed.

An observer 15 can observe the image 31 of the motif formed on the display by observing the display surface 1S of the display 1. In other words, the display can show the motif. That is, the image of the motif appears. However, under the condition where the display is irradiated with visible light from a light source 16 in a direction perpendicular to the display surface 15, when the display 1 is observed in a direction perpendicular to the front of the display 1 as shown in FIG. 25(a), the image 31 is not observed. That is, the image of the motif disappears.

Further, as shown in FIG. 25(b), when the display surface 1S is irradiated with visible light, and the display 1 is observed in a direction not perpendicular to the front of the display 1, the image 31 (heart shape) can be observed. That is, the image 31 appears. Further, as shown in FIG. 25(c), under the condition where a surface of the display opposite to the display surface 1S is irradiated with light from the light source 16, when the display 1 is observed in a direction perpendicular to the front of the display 1, the observed image 31 has a color different from that of the image observed in a direction not perpendicular to the front of the display 1 while being irradiated with visible light as shown in FIG. 25(b). That is, the color of the image that appears is different between under the condition where the display surface 1S is irradiated with visible light and the display 1 is observed in a direction not perpendicular to the front of the display 1 and under the condition where a surface of the display opposite to the display surface 1S is irradiated with light from the light source 16 and the display 1 is observed in a direction perpendicular to the front of the display 1.

In observation of the display, light in the visible wavelength range from the light source 16 can be parallel light. Accordingly, the display can be uniformly observed.

Figure 26A:
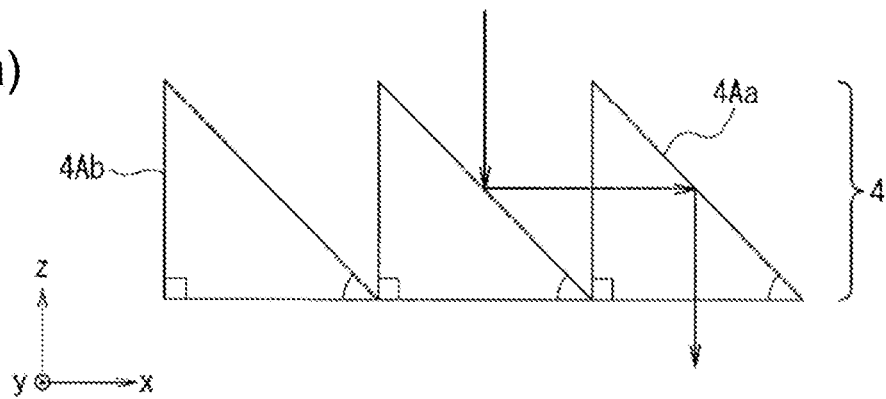
Figure 26B:
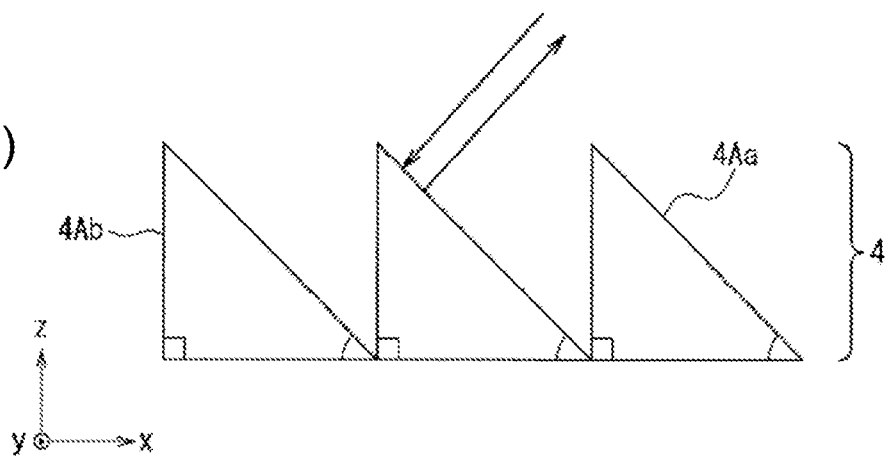
Figure 26C:
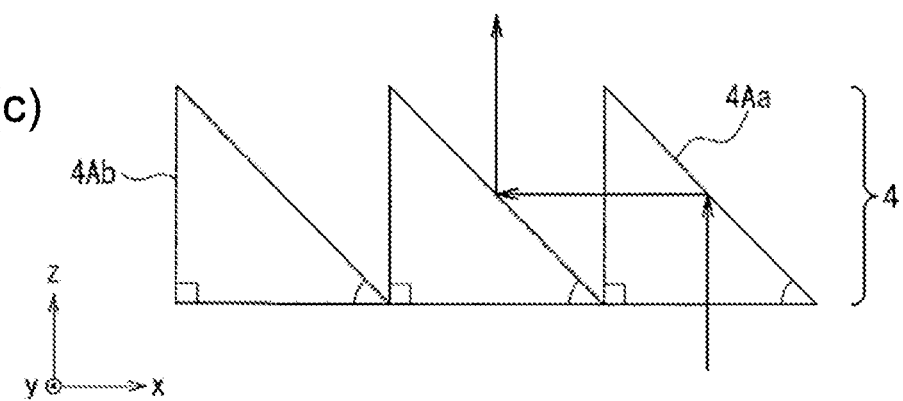

The above mechanism will be described by using optical paths in connection with FIGS. 26(a) to 26(c). The function shown in FIGS. 25(a), 25(b), and 25(c), and the mechanism shown in FIGS. 26(a), 26(b), and 26(c) are related to each other. For example, the function shown in FIG. 25(a) is realized by the mechanism shown in FIG. 26(a). Further, for simplification of the schematic diagram, in FIGS. 26(a), 26(b), and 26(c), only the microstructure formed of the micro concavo-convex structure layer 4 is shown. However, as described above, the optically variable layer 30 is formed on each of the second surface 4Ab and the first surface 4Aa.

As shown in FIG. 26(a), light emitted from the light source 16 facing the display surface 1S in a direction perpendicular to the display surface 1S is incident on the first surface 4Aa. Here, since the outermost surface of the optically variable layer 30 is a metal reflective layer, specular reflection occurs.

In the configuration in which the inclination angle of the first surface 4Aa is 45 degrees, light is reflected by specular reflection in a direction perpendicular to the inclined surface of the second surface 4Ab. Further, the metal reflective layer formed on the second surface 4Ab has an integrated transmittance for the visible light from the light source 16 higher than an integrated reflectance. Accordingly, most of the light reflected by the first surface 4Aa passes through the second surface 4Ab. Further, light that has passed the second surface 4Ab is again incident on the inclined surface of the first surface 4Aa, and the metal reflective layer provided on the first surface 4Aa causes specular reflection. As a result, light is transmitted in the direction opposite to the display surface 1S. Therefore, the configuration has a function of transmitting light incident on the display 1 and the state of configuration is put into that do not appear the image 31.

As shown in FIG. 26(b), light emitted from the light source 16 facing the display surface 1S at an angle of 45 degrees relative to the display surface 1S is incident on the first surface 4Aa. Accordingly, the metal reflective layer provided on the outermost surface of the optically variable layer 30 causes specular reflection.

For example, in the configuration in which the inclination angle of the first surface 4Aa is 45 degrees, light is reflected by specular reflection in a direction of the incident light. Accordingly, when the observer 15 observes at an angle of 45 degrees, this reflection can be recognized. In this case, the image 31 (of a heart shape) appears as an image (of a heart shape) having an achromatic color and high brightness.

As shown in FIG. 26(c), light of the visible wavelength is emitted from the light source 16 to the surface opposite to the display surface 1S in a direction perpendicular to the display surface 1S. When the inclination angle of the first surface 4Aa is set to 45 degrees, the optical path is directed opposite to that in FIG. 26(a). However, unlike the case of FIG. 26(a), the shape can be observed in the case of FIG. 26(c).

That is, the dielectric multilayer provided on the second surface 4Ab and the first surface 4Aa causes multilayer interference, which increases reflectance at a specific wavelength so that the observer 15 can observe light of a specific wavelength. Accordingly, when the observer 15 observes the display 1 in a direction perpendicular to the front of the display 1, the image 31 can be observed as a shape having a color of the specific wavelength. The specific wavelength for blue may be in the range of 400 nm or more and less than 490 nm, and more preferably in the range of 435 nm or more and 480 nm or less. The specific wavelength for green may be in the range of 490 nm or more and 580 nm or less, and more preferably in the range of 500 nm or more and 560 nm or less. This diffracted light can display the image. The specific wavelength for red may be in the range of 595 nm or more and 800 nm or less, and more preferably in the range of 610 nm or more and 750 nm or less.

For multilayer interference, the wavelength increased by interference can be calculated based on the refractive index and the film thickness of the layer and the incidence angle. The multilayer interference is determined based on the layer thicknesses and the refractive indices of the dielectric multilayer and the metal reflective layer constituting the optically variable layer 30. Accordingly, it is possible to design the color displayed under the observation condition of FIG. 25(c).

Figure 27:
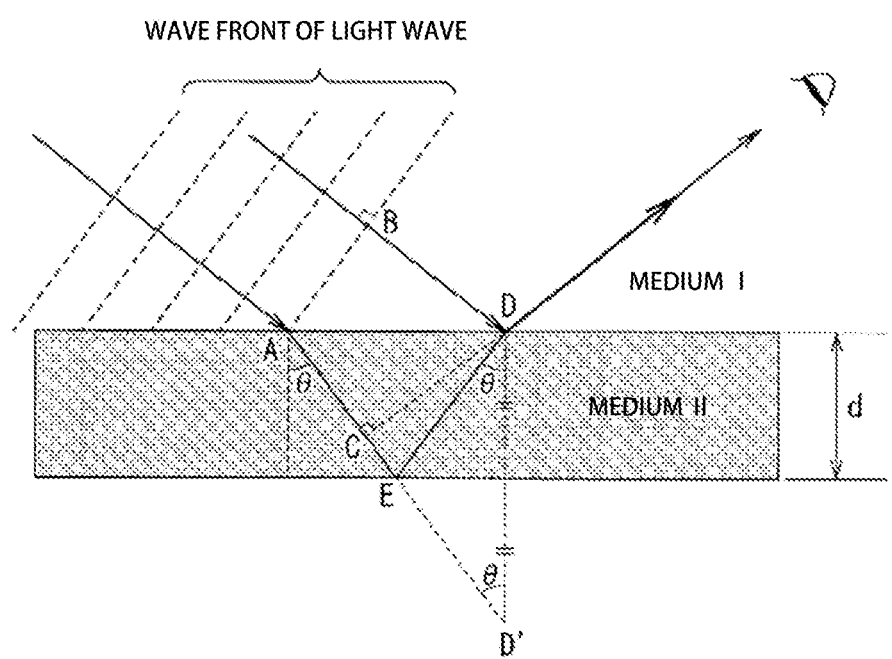
FIG. 27 is a view illustrating a principle of light interference by a thin film.

In general, interference phenomenon of light can be described as shown in FIG. 27.

That is, the wave fronts of light waves are partially reflected by the upper surface of the thin film (medium II), and partially refracted into the layer (medium II) and then reflected by the lower surface. Then, two light waves interfere with each other at the upper surface, and reach the observer's eye. The optical path difference between these two light waves can be represented as AED−BD.

When the refractive index of the medium I is $n_1$ and the refractive index of the layer (medium II) is $n_2$, the optical path difference between these two light waves can be represented as $n_2 \times AED - n_1 \times BD$. Further, since the BD and AC have the same optical distance, $n_1 \times BD$ can be equal to $n_2 \times AC$. Therefore, equation (5) holds.

$$n_2 \times AED - n_1 \times BD = n_2 \times AED - n_2 \times AC \quad (5)$$

Further, since $n_2 \times AED - n_2 \times AC$ can be represented as $n_2 \times CED$, equation (6) holds.

$$n_2 \times AED - n_2 \times AC = n_2 \times CED \quad (6)$$

When a symmetric point of a point D relative to the lower surface of the layer (medium II) is represented as D', ED is equal to ED', and equation (7) holds.

$$CED = CD' \quad (7)$$

In a right-angled triangle CDD', CD' can be represented as DD' cos θ. Accordingly, when the thickness of the layer (medium II) is d, the optical path difference, that is, $n_2 \times CED$ can be expressed by equation (8).

$$n_2 \times CED = n_2 \times DD' \cos\theta = 2n_2 d \cos\theta \quad (8)$$

Depending on the optical path difference caused by the layer (medium II), the reflected light emitted from the point D includes interference between the reflected light from the upper surface of the layer (medium II) and the reflected light emitted from inside the layer (medium II).

If $n_1 < n_2$, the wavelength increased by two lights can be represented as $(m+½)\lambda$. Accordingly, in order to display the designed color, the layer (medium II) can be designed under the condition that equation (9) holds.

$$2n_2 d \cos\theta = (m+½)\lambda \quad (9)$$

(where m=0, 1, 2, 3, . . . )

The image that appears on the display 1 may be a vector image represented by a group of regions represented by a vector, or may be a raster image represented by a group of unit images.

Figure 28:
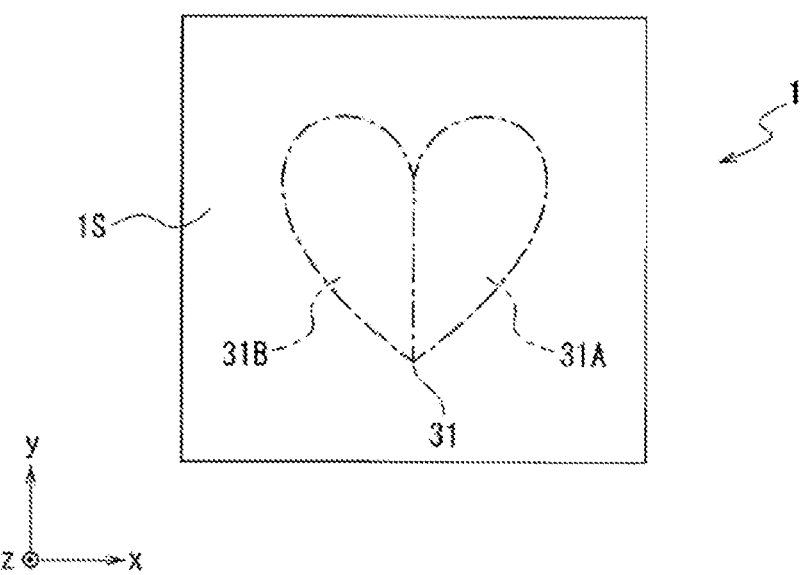
FIG. 28 is a plan view illustrating a planar structure of a display according to one embodiment of the display.

The image 31 may be an image formed of a plurality of regions. In FIG. 28, the image 31 includes a region 31A and a region 31B. With this configuration, a heart shape is formed.

The respective regions of the micro concavo-convex structure layer 4 include a plurality of microstructures, and the microstructures provided in the region 31A and the microstructures in the region 31B may be uniformly arranged in each region. Further, the inclination angle of the first surface 4Aa may be different for each region.

For the plurality of microstructures in the respective regions, the periodicity of the structures is preferably in the range of 1 μm or more and 300 μm or less.

Although the plurality of microstructures arranged at a constant periodicity causes a diffraction effect, diffraction of visible light is reduced by setting the periodicity to 1 μm or more. Further, when the periodicity is set to 300 μm or less, the resolution can be made smaller than that of the human eye so that the microstructures are not recognized by the observer 15 observing the display 1. That is, the microstructures are recognized as a single object. As a result, the visibility of the display can be improved. In addition, the aesthetic appearance can be improved.

Figure 29A:
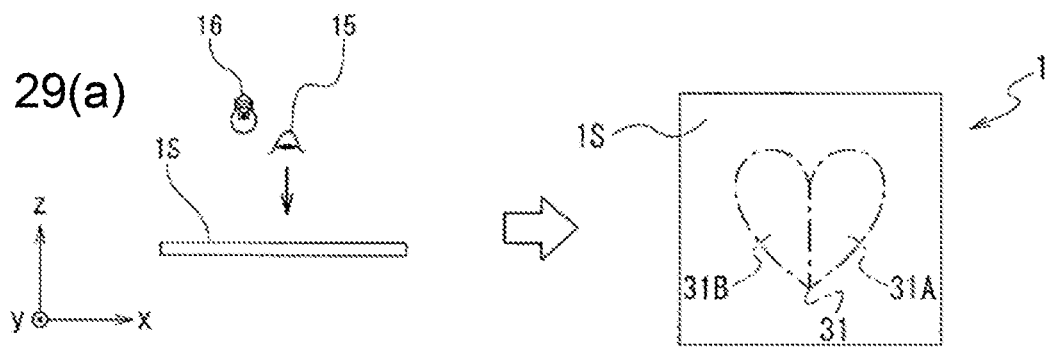
Figure 29B:
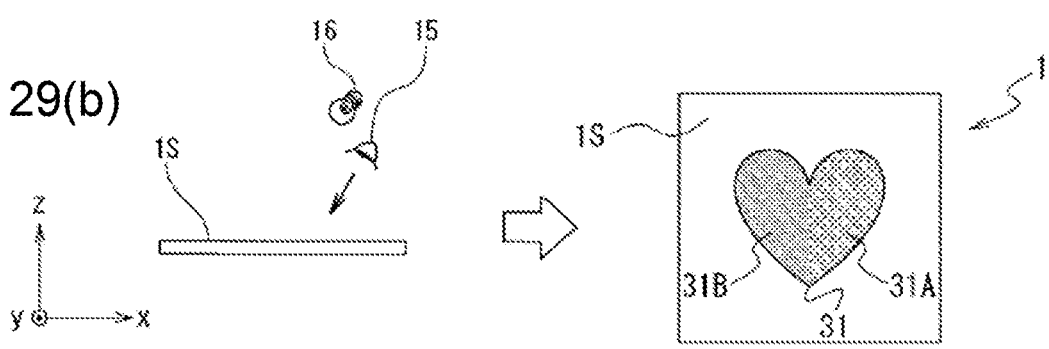
Figure 29C:
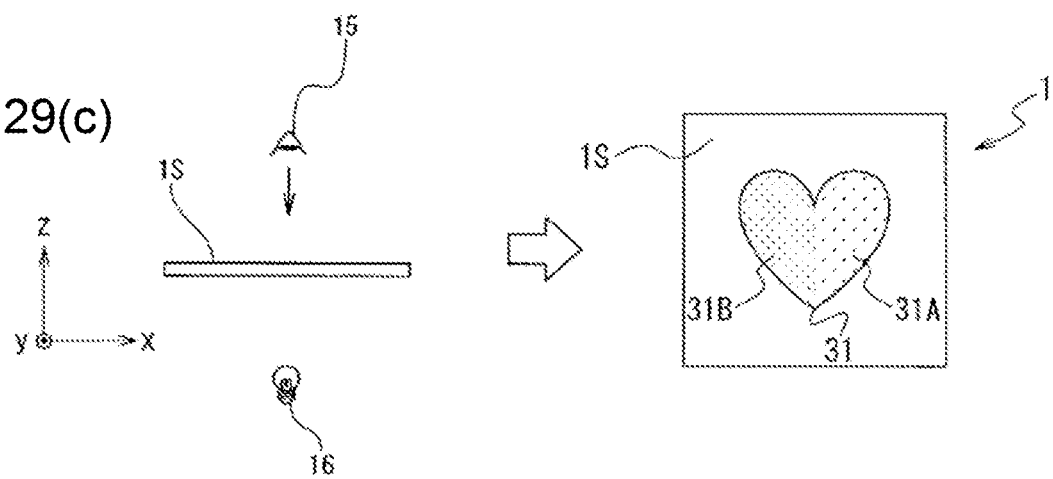

FIGS. 29(a), 29(b), and 29(c) are views illustrating an image that appears when the above configuration is observed in the same directions as in FIGS. 25(a), 25(b), and 25(c). As shown in FIG. 29(a), even if the inclination angle of the first surface 4Aa is different for each region, the effect described in connection with FIG. 25(a) is kept. Accordingly, difference in recognition between the region 31A and the region 31B is not made, which can provide the state that image 31 is not recognized.

In a configuration in which the inclination angle of the first surface 4Aa is different for each region, as shown in FIG. 29(b), the observer 15 can observe different reflection characteristics for each region. More specifically, when the observation angle is limited, the amount of reflected light for each region varies depending on the inclination angle of the first surface 4Aa. Accordingly, although the image 31 is still achromatic, the observer 15 can recognize grayscale information for each region.

When the shades are controlled to be different for each region, the depth information of the three-dimensional object can be converted and expressed by shading. Thus, the appearance of the image 31 can be three-dimensional.

Further, as shown in FIG. 29(c), the inclination angle of the first surface 4Aa can be different for each region to vary the angle of incidence on the dielectric multilayer provided on the first surface 4Aa for each region. Accordingly, the wavelength varies for each region, and the reflected light of different wavelength for each region can be emitted.

Therefore, when the observer 15 observes the display 1, light of a specific wavelength is recognized in each region in the image 31, and the color is different for each region. Thus, the aesthetic appearance of the display can be improved.

In another configuration, the arrangement direction of the second surface 4Ab and the first surface 4Aa may be different for each region.

Further, a different image can be formed for each region. Under the observation condition described in connection with FIG. 29(a), all the regions perform the same effect and is not able to recognize an image, whereas, under the observation condition described in connection with FIG. 28(b), only a part of the region performs an effect and displays an image (for example, "A"). When observation is performed at an angle different from that described in connection with FIG. 29(b), another part of the region exhibits an effect and displays another image (for example, "B"). Thus, different effects can be imparted at different observation angles. The same applies to FIG. 29(c). That is, the number of images 31 appearing on the display 1 can be increased by controlling the inclination angle and the orientation of the inclination surface for each region.

In other words, images can be formed by controlling the inclination angle and the orientation of the inclination surface for each region so that an image attributed to the microstructure cannot be observed under the observation condition described in FIG. 29(a), and different images can be observed depending on the observation angle and direction under the observation condition described in FIG. 29(b). Further, under the observation condition described in FIG. 29(c), images are expressed by the difference in inclination direction, and the image under the observation condition described in FIG. 29(b) is observed to have an integrated appearance. Accordingly, an image or a hue different from that observed under the observation condition described in connection with FIG. 29(b) can be expressed so that a variety of images can be expressed depending on the observation condition of the display.

When the structures in each region have a constant periodicity, the height of the structures can be controlled to vary the inclination angle for each region. However, the technique for varying the inclination angle is not limited to controlling the height of the structures for each region. Even if the structures in each region have a constant periodicity, a similar effect can be obtained by varying the periodicity of the structures for each region.

In order to facilitate processing, the height of the structures can be the same for each region while the periodicity of the structures can be varied for each region.

Further, the present embodiment can be modified to have a print layer provided under the micro concavo-convex structure layer 4, that is, on the entirety or part of the surface opposite to the display surface (1S). In this case, under the observation condition of FIG. 29(a), a print layer can be displayed as a new image while the image 31 cannot be recognized.

In addition, optical properties of the optically variable layer 30 may be different for each region. Even if the microstructures of the micro concavo-convex structure layer 4 are the same for each region, the wavelength range of light reflected by the optically variable layer 30 provided on the first surface 4Aa or the wavelength range of light that has been transmitted therethrough can be different so that different colors are observed for each region under the observation condition of FIG. 29(c). More specifically, the wavelength range of light reflected by the optically variable layer 30 provided on the first surface 4Aa, or the wavelength range of light transmitted therethrough can be different for each region. The wavelength range of light reflected by the optically variable layer 30, or the wavelength range of light transmitted therethrough can be modulated by the thickness of the respective layers of the dielectric multilayer.

Further, when the material of the micro concavo-convex structure layer 4 having the microstructures has a higher ratio of transmittance than absorption at least in a specific wavelength of the incident visible light, visibility of the image at this wavelength by the observer 15 can be improved. Accordingly, the visibility of the image can be improved. The specific wavelength for blue may be in the range of 400 nm or more and less than 490 nm, and more preferably in the range of 435 nm or more and 480 nm or less. The specific wavelength for green may be in the range of 490 nm or more and 580 nm or less, and more preferably in the range of 500 nm or more and 560 nm or less. This diffracted light is able to show the image. The specific wavelength for red may be in the range of 595 nm or more and 800 nm or less, and more preferably in the range of 610 nm or more and 750 nm or less.

In addition, an absorption layer can be further provided on at least part of the surface of the micro concavo-convex structure layer 4 facing away from the microstructures so that the absorption layer absorbs the wavelength range of light reflected at the inclination angle of the first surface 4Aa or the optically variable layer (30SB) on the first surface or the wavelength range of transmitted light.

By providing such an absorption layer, the ratio of absorption becomes higher than transmittance in the specific wavelength range, and the observer 15 can observe a complementary color of the color of the absorbed wavelength range. Therefore, by combining with the interference light from the dielectric multilayer of the first surface optically variable layer (30SB), it is possible to display an image in which a wavelength range other than the wavelength that is increased by interference due to the dielectric multilayer is absorbed. As a result, the image 31 with increased saturation can be displayed.

The configurations described so far is examples of the display 1, and it is also possible to provide the display 1 having a combination of the configurations of the embodiments described above, or a composite thereof. In addition, when there are different regions in the display 1 and the inclination angle of the first surface 4Aa is different for each region, the layer thickness of the first surface optically variable layer (30SB) provided on the first surface 4Aa may be different in a part of the region, and further, a print layer may be selectively provided under the micro concavo-convex structure layer 4 in the part of the region.

Moreover, in a region adjacent to or separated from an image region composed of the second surface 4Ab and the first surface 4Aa of the micro concavo-convex structure layer 4, there may be provided microstructures composed of flat surfaces, matte surfaces, diffraction structures, or a plurality of surfaces (planes) having different distances from the surface of the micro concavo-convex structure layer 4, a one-dimensional grating in which structures of a half of the light wavelength or more are arranged in one direction, or a two-dimensional grating in which structures of the light wavelength or less are arranged in two intersecting directions.

A plurality of surfaces having different distances from the surface of the micro concavo-convex structure layer 4 are surfaces (planes) parallel to the plane of the micro concavo-convex structure layer 4, which are a plurality of surfaces having different depth or height from a reference surface when the plane of the micro concavo-convex structure layer 4 is defined as the reference surface. The plurality of surfaces have the same depth or height from the reference surface in a certain region. A plurality of such regions may be provided, or may have depth or height different for each region.

By providing such a plurality of surfaces, specific colors can be expressed according to the depth or height.

In addition, the above one-dimensional grating is able to diffract diffracted light in one direction according to the arrangement direction of the grating, and the above two-dimensional grating has characteristics that facilitate light absorption.

By providing such a structure in the micro concavo-convex structure layer 4 in addition to the image region formed of the second surface 4Ab and the first surface 4Aa, a better aesthetic appearance can be imparted.

[Method of Producing Display]

The method of producing the above display 1 can include a step of replicating a microstructure formed on the micro concavo-convex structure layer 4, and a step of providing an optically variable layer 30 on the second surface 4Ab and the first surface 4Aa of the microstructure.

Examples of the above step of replicating a microstructure formed on the micro concavo-convex structure layer 4 include replication by using an embossed original plate. The original plate having a shape of the micro concavo-convex structure can be produced by applying a photosensitive material on one side of a plate-shaped substrate, and scanning the applied photosensitive material with a laser beam or an electron beam for exposure, followed by development.

Then, a metal stamper is produced from the original plate by electroplating or the like, and this metal stamper is stamped to replicate a microstructure that constitutes an image forming layer.

In addition, the metal stamper may also be produced by cutting a metal substrate by using a lathe.

Examples of the method of replicating the microstructure by using the stamper obtained as described above include methods for forming a molded product by hot embossing, casting, or a photopolymer technique. Subsequently, the optically variable layer 30 is provided on the surface of the obtained molded product by vapor deposition or the like to there by obtain the display 1.

In the photopolymer method, a radiation-curable resin is introduced into a space between a flat substrate such as a plastic film and a metal stamper, and the radiation-curable resin is cured by irradiation with radiation. Then, the cured resin film in each substrate is peeled from the metal stamper. The photopolymer method is preferred compared with a pressing method and a casting method using a thermoplastic resin in that it has high structural accuracy, and is excellent in thermal stability and chemical resistance.

The substrate for the micro concavo-convex structure layer 4 may be a plastic film. The plastic film may be a transparent plastic film. Examples of the plastic film include plastic films made of resins including polyester resins such as polyethylene terephthalate and polyethylene naphthalate, polyolefin resins such as polycarbonate resin, acrylic resin, and polypropylene, polyimide resins, cellulose resins such as triacetylcellulose, and vinyl resins such as vinyl chloride and polyvinyl alcohol.

These substrates may be subjected to various treatments such as easy-adhesion treatment and antistatic treatment. The above resin materials may be used singly or a laminate obtained by combining a plurality of materials may be used.

The material for the micro concavo-convex structure layer 4 may be a resin. The material for the micro concavo-convex structure layer 4 may include at least one of a curing agent, a plasticizer, a dispersant, various leveling agents, an ultraviolet absorber, an antioxidant, a viscosity modifier, a lubricant, a colorant such as a dye or pigment, and a photostabilizer, in other words, one or a plurality thereof.

Examples of the above resins include poly(meth)acrylic resin, polyurethane resin, fluororesin, silicone resin, polyimide resin, epoxy resin, polyethylene resin, polypropylene resin, methacrylic resin, polymethyl pentene resin, cyclic polyolefin resin, polystyrene resin such as acrylonitrile-(poly)styrene copolymer (AS resin) and acrylonitrile-butadiene-styrene copolymer (ABS resin), polyvinyl chloride resin, polycarbonate resin, polyester resin, polyamide resin, polyamide imide resin, polyacrylic phthalate resin, polysulfone resin, polyphenylene sulfide resin, polyethersulfone resin, polyethylene naphthalate resin, polyether imide resin, acetal resin, and cellulose resin. These resins may be used singly or two or more may be mixed for forming the microstructure.

Further, when a photopolymer method is used as a method of providing a microstructure on the micro concavo-convex structure layer 4, radiation-curable resins are used. The radiation-curable resins typically include a polymerizable compound and an initiator.

The polymerizable compound can be a photoradically polymerizable compound. Specifically, the polymerizable compound may be a monomer, oligomer, or a polymer having an ethylenic unsaturated bond or an ethylenic unsaturated group. Alternatively, the photoradically polymerizable compound may be a monomer such as 1,6-hexanediol, neopentyl glycol diacrylate, trimethylolpropane triacrylate, pentaerythritol acrylate, pentaerythritol tetraacrylate, pentaerythritol pentaacrylate, or dipentaerythritol hexaacrylate, an oligomer such as epoxy acrylate, urethane acrylate, or polyester acrylate, or a polymer such as urethane acrylate, epoxy acrylate, or acrylic acrylate.

When a photoradically polymerizable compound is used as a polymerizable compound, a photoradical polymerization initiator can be added as an initiator.

Examples of the photoradical polymerization initiator include a benzoin-based compound such as benzoin, benzoin methyl ether, and benzoin ethyl ether, an anthraquinone-based compound such as anthraquinone and methyl anthraquinone, a phenyl ketone-based compound such as acetophenone, diethoxy acetophenone, benzophenone, hydroxy acetophenone, 1-hydroxycyclohexyl phenyl ketone, α-amino acetophenone, and 2-methyl-1-(4-methylthiophenyl)-2-morpholinopropane-1-one, benzyl dimethyl ketal, thioxanthone, acylphosphine oxide, and Michler's ketone.

The polymerizable compound and the polymerization initiator are not necessarily limited to a photoradical polymerization type, and may also be a cationic polymerization type or the like.

Further, a sensitizer or the like may be added to the polymerizable compound, or an electron beam may be used as radiation without adding a polymerization initiator or a sensitizer.

The optically variable layer 30 can be formed by deposition. The deposition may be physical deposition or chemical deposition. The physical deposition may be vacuum vapor deposition, sputtering, ion plating, or ion cluster beam method. The chemical deposition may be plasma chemical vapor deposition, thermal chemical vapor deposition, or photochemical deposition.

Among these methods, vacuum vapor deposition has higher productivity than other methods, and can form the optically variable layer 30 with high quality. Further, vacuum vapor deposition can control the layer thickness of the optically variable layer 30 formed on the second surface 4Ab and the first surface 4Aa. Among the vapor deposition methods, an oblique vapor deposition method can be used to differentiate between the layer thicknesses of the optically variable layers 30 provided on the second surface 4Ab and the first surface 4Aa.

The optically variable layer 30 may be formed of a metal reflective layer. A metal or an alloy may be used for the metal reflective layer. The metal may be aluminum, gold, silver, platinum, nickel, tin, chromium, or zirconium. The alloy may be an alloy of these metals. Further, the dielectric multilayer can be formed by alternately depositing a high refractive index material and a low refractive index material. The material for the dielectric multilayer may be, in addition to a metal such as nickel, a metal such as titanium or tantalum, silicon, an oxide of a semiconductor, zinc sulfide, or magnesium fluoride.

The visibility of the display can be improved when the display has a configuration in which: the optically variable layer is formed so as to vary a reflection wavelength or a transmitted wavelength of the visible light incident on the second surface and the first surface; the optically variable layer is composed of a multilayer having a dielectric multilayer and a metal reflective layer; the optically variable layer formed on the first surface has a layer thickness larger than that of the optically variable layer formed on the second surface; the metal reflective layer provided on the second surface has an integrated transmittance in the visible light wavelength higher than an integrated reflectance; and the metal reflective layer provided on the first surface has an integrated transmittance lower than an integrated reflectance.

With this configuration, under at least three observation conditions including the observation condition that the display is observed in a direction perpendicular to the front of the display, the condition that the display is observed at an angle not perpendicular to the front of the display, and a condition that the display is observed while the rear surface of the display is irradiated with visible light, the optical function may be different between the second surface and the first surface so that different images can be observed. In other words, different images can appear on the display due to the change in optical function between the second surface and the first surface under these three observation conditions. Accordingly, the display can be verified.

Further, in a configuration in which a plurality of microstructures 4A constituting the image forming layer are individually formed in each of a plurality of regions, and the inclination angle of the first surface and the orientations of the second surface and the first surface at least in a part of the region are different from those in other region, it is possible to form an image having a different visual effect for each region, and control the direction in which the display is observed to thereby increase the degree of freedom in formation of the image.

In a configuration in which, in the plurality of regions, a difference in the layer thicknesses between the optically variable layer provided on the second surface and the optically variable layer provided on the first surface at least in a part of the region is different from that in other regions, it is possible to recognize a different color for each region so that a colorful image can be formed in each region. Further, the image can be colored with various colors.

In a configuration in which the micro concavo-convex structure layer 4 constituting the image forming layer has a higher ratio of transmittance than absorption at a specific wavelength when visible light is incident, the transmittance increases under the condition where the display is observed in a direction perpendicular to the front of the display while the rear surface of the display is irradiated with visible light, and an image with high visibility can be observed.

Further, in a configuration in which an absorption layer is provided on at least part of the surface facing away from the plurality of microstructures 4A so that the absorption layer absorbs the wavelength range of reflected light according to the inclination angle of the first surface or the layer thickness of the optically variable layer or the wavelength range of transmitted light, the image that appears can be highly saturated by absorbing unnecessary wavelengths under the condition where the display is observed while the rear surface of the display is irradiated with visible light.

Moreover, in a configuration in which the reflectance is different between the condition where the visible light is irradiated in a direction perpendicular to the display surface and the condition where the visible light is irradiated in a specific direction, which is different from the perpendicular direction, it is possible to impart different optical functions between the condition where the display is observed in a direction perpendicular to the front of the display and the condition where the display is observed in a direction not perpendicular to the front of the display so that different images can appear.

Further, in a configuration in which the plurality of microstructures 4A are formed of periodical structures, and the periodicities are different in some or all of the regions, the visibility can be different for each region under at least three observation conditions including the condition that the display is observed in a direction perpendicular to the front of the display, the condition that the display is observed in an angle not perpendicular to the front of the display, and a condition that the display is observed while the rear surface of the display is irradiated with visible light. Accordingly, the appearance of image can be different for each of the three observation conditions. In addition, one motif can be provided with an image having various appearances.

Further, in a configuration in which the periodicity of the plurality of microstructures is in the range of 1 µm or more and 300 µm or less, it is possible to reduce diffracted light of the visible light so that the diffracted light is not recognized as a noise by the observer, and to prevent the structures from being recognized when the display is observed since the resolution is smaller than that of human eyes.

As described above, according to the display of the present invention, a display with high identification performance can be obtained.

Further, according to the above display, a motif image in the display can have different appearances under each of at least three observation conditions. The image having different appearances is effective for verification by the observer. Thus, a display that is reliably verifiable can be achieved.

[Modifications]

(1) In the above first to fourth embodiments, the color layer 7 is provided on the microstructure 4A in the region 2. However, a color layer 7 different from that in the region 2 may be provided on the microstructure 4A in the region 3. That is, different color layers 7 may be provided for the respective regions.

In the configuration of the first embodiment, light passes through the region 3, since only the microstructure 4A is provided in the region 3 where the color layer 7 is not provided. Accordingly, as in the second embodiment, it is necessary to provide a print layer or a reflective layer as the visual effect imparting layer 8 to express colors.

On the other hand, by providing a different color layer 7 for each region, the region 3 can have different color from the region 2 without providing the visual effect imparting layer 8.

(2) Further, the orientation of the microstructure 4A in the region 2 and the orientation of the microstructure 4A in the region 3 may be different from each other. That is, the orientation of the microstructure 4A may be different for each region.

Further, the inclination angle β of the first surface 4Aa of the microstructure 4A may be different from each other.

By providing the microstructure in which orientation of the first surfaces 4Aa and the inclination angles are different for each region, and the color layer 7 described above, a wide variety of colors can be expressed.

Figure 19:
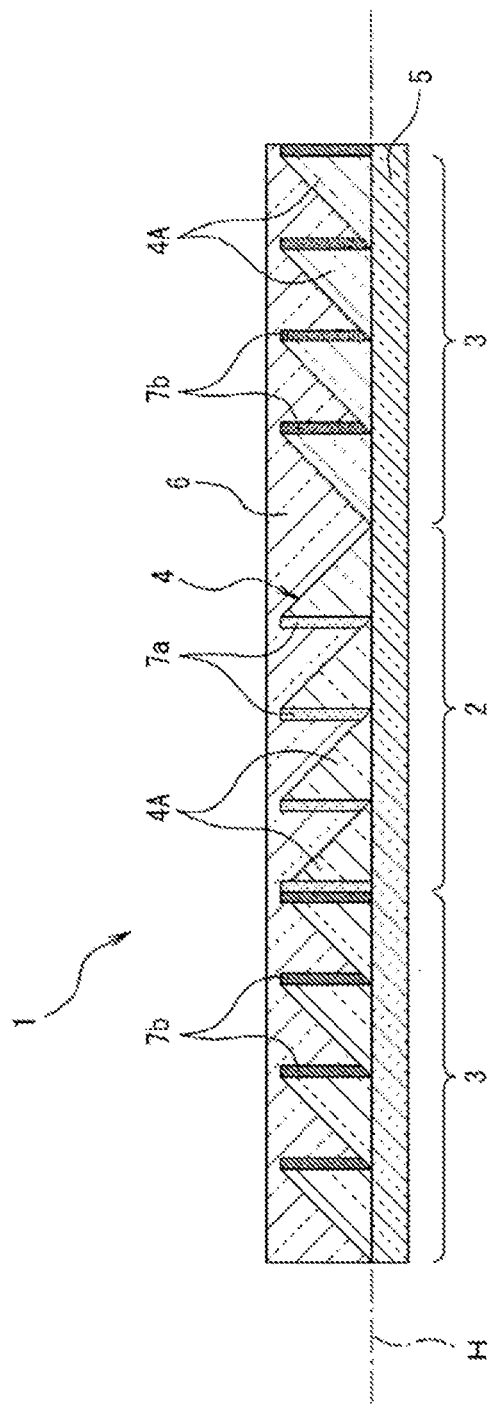
FIG. 19 is a cross-sectional view illustrating a display according to a modified example.

As shown in FIG. 19, the description will be given of a case where different color layers 7 are provided in the region 2 and the region 3 in the configuration of the first embodiment, and the first surfaces 4Aa of the microstructures in these regions are oriented in different directions.

Figure 20A:
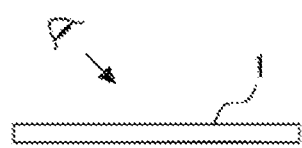
FIGS. 20(a), 20(b), 20(c), 20(d), 20(e), and 20(f) are views illustrating a relationship between an observation direction and an image that appears according to the modified example.
Figure 20B:
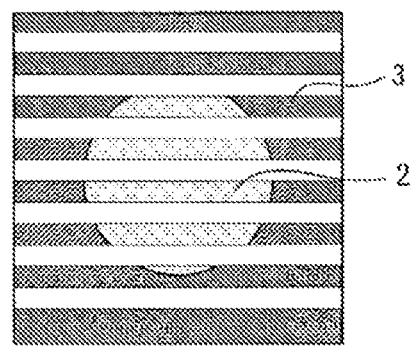

In this case, as shown in FIG. 20(a), when the display surface of the display 1 is obliquely observed in one direction (from the left side), the color layer 7a is recognized in the region 2, whereas the color layer 7b is partially recognized in the region 3. Accordingly, an image as shown in FIG. 20(b) appears.

Figure 20C:
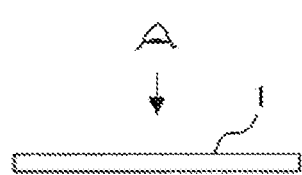
Figure 20D:
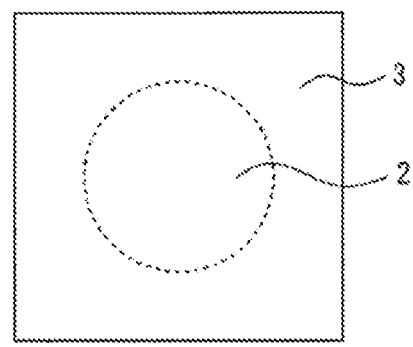

As shown in FIG. 20(c), when the display surface of the display 1 is observed from directly above, the micro concavo-convex structure layer 4 transmits light in both the regions 2 and 3 and is thus colorless. Accordingly, an image as shown in FIG. 20(d) appears.

Figure 20E:
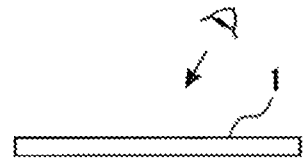
Figure 20F:
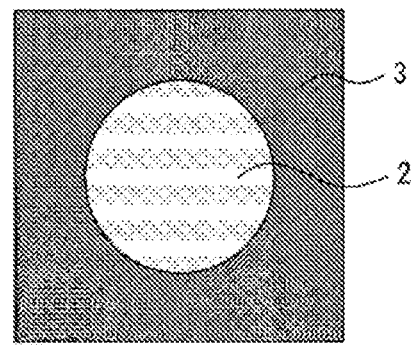

In addition, as shown in FIG. 20(e), when the display surface of the display 1 is observed obliquely observed in the other direction (from the right side), the color layer 7a is partially recognized in the region 2, whereas the color layer 7b is recognized in the region 3. Accordingly, an image as shown in FIG. 20(f) appears.

(3) Further, different color layers 7 may be provided by combining different colors and reflective layers or ink having different absorption wavelengths.

In this case, transparency effects and recognition in a particular wavelength at a specific angle is enabled.

(4) In addition, different visual effect imparting layers 8 can be provided on the bottom 4Ac of the micro concavo-convex structure layer 4 on which different color layers 7 are provided.

When a print layer is provided as the visual effect imparting layer 8, the underlying design can be observed in light transmission. Further, when a layer having a different refractive index is provided as the visual effect imparting layer 8, a critical angle for total reflection varies depending on the angle that forms the inclined surface of the micro concavo-convex structure layer even in the same observation direction. Accordingly, the display can be in a state in which colors appear and a state in which colors disappear. The state in which colors appear and the state in which colors disappear can be switched. This switching can be performed according to the observation direction.

(5) Different color layers 7 may not be necessarily provided on the microstructures 4A on the inclined surfaces oriented in different directions, and different color layers 7 may be provided in the region in which the inclined surfaces are oriented in the same direction.

In this case, colors can appear and disappear for one motif depending on the angle.

(6) When layers having different refractive indices are provided on the visual effect imparting layer 8, the angle of the micro concavo-convex structure layer 4 can be varied stepwise.

In this case, the critical angle can be adjusted to display an image that appears to be continuously moving.

(7) Further, the color layers 7 may be the same for a plurality of regions, and the concealing layers 9 may be different for each region.

When the concealing layers 9 are different as described above, an image can appear only at a particular angle.

In the above embodiment, the motif can be disappeared state only by light transmission. However, in a configuration having the same visual effect imparting layer 8 and different concealing layers 9, the entire color can be uniform to thereby be the image to disappear.

When the visual effect imparting layer 8 is a reflective layer or a layer having a different refractive index, different images can be displayed between when the pattern of the color layer 7 is recognized by being totally reflected at the interface between the micro concavo-convex structure layer 4 and the visual effect imparting layer 8 and when the concealing layer 9 is recognized. Thus, a display with high verification performance due to different concealing layers 9 can be provided.

As shown in FIG. 21, the same color layers 7 can be provided for the regions 2 and 3. Further, the concealing layer 9 may be different for each of the region 2 and the region 3.

Figure 22A:
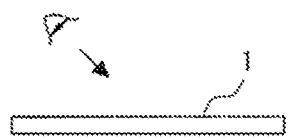
FIGS. 22(a), 22(b), 22(c), 22(d), 22(e), 22(f), 22(g), and 22(h) are views illustrating a relationship between an observation direction and an image that appears according to the modified example.
Figure 22B:
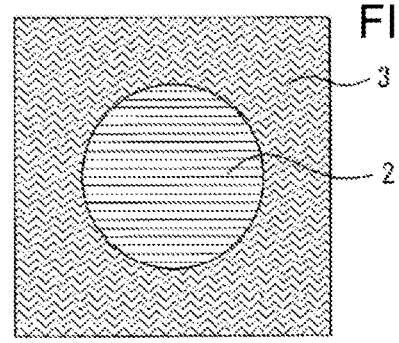

In this case, as shown in FIG. 22(a), under the condition where the display 1 is obliquely observed in one direction (from the left side), the concealing layer 9b can be seen in the region 3 and the concealing layer 9a can be seen in the region 2. Accordingly, an image formed by the region 3 and the region 2 appears on the display as shown in FIG. 22(b).

Figure 22C:
Figure 22D:
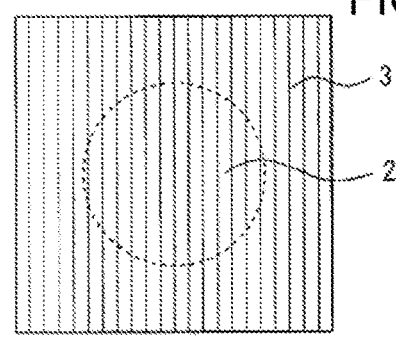

As shown in FIG. 22(c), under the condition where the display 1 is observed from directly above, light passes through the micro concavo-convex structure layer 4 in the regions 2 and 3, and the visual effect imparting layer 8 can be seen. Accordingly, as shown in FIG. 22(d), an image is observed. That is, an image formed by the regions 2 and 3 appears on the display.

Figure 22E:
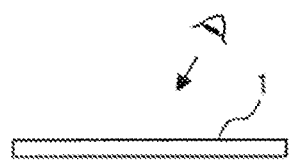
Figure 22F:
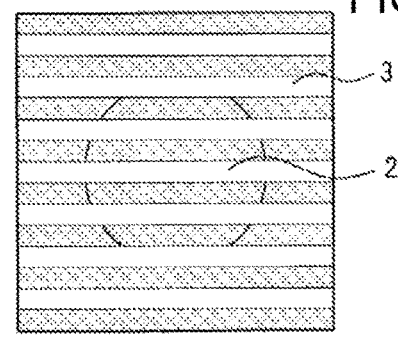
Figure 22G:
Figure 22H:
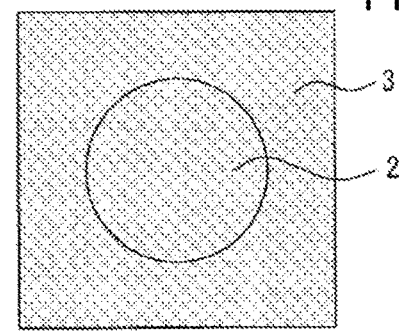

As shown in FIGS. 22(e) and (g), under the condition where the display 1 is obliquely observed in the other direction (from the right side), total reflection occurs when the incidence angle is equal to or larger than a critical angle since the critical angle depends on the refractive indices of the micro concavo-convex structure layer 4 and the visual effect imparting layer 8 as described above. Under the condition where total reflection does not occur since the incidence angle of light is equal to or smaller than the critical angle as shown in FIG. 22(e), light incident on the inclined surface of the micro structure is transmitted, and the color layer 7 can be partially seen in the regions 2 and 3. Accordingly, an image appears on the display as shown in FIG. 22(f). On the other hand, under the observation condition where total reflection occurs as shown in FIG. 22(h), the color layer 7 causes reflection at the interface with the visual effect imparting layer 8 in the regions 2 and 3. Accordingly, as shown in FIG. 22(h), an image appears on the display.

(8) Further, the inclined surface of the micro concavo-convex structure layer, on which the color layer 7 and the concealing layer 9 are provided, may be oriented in different directions for each region, and the color layer 7 may be different for each region. In addition, the region in which different color layers 7 are provided may be different from the region in which the inclined surfaces of the micro concavo-convex structure layer are oriented in different directions.

(9) The visual effect imparting layer 8 may be different for each region.

In this case, the visual effect imparting layer 8 may display a different appearance for each region.

A colored print may be provided in part, and a layer having a different refractive index or a reflective layer may be provided in another part. With this configuration, total reflection occurs in part, and the color of the color layer 7 can be observed at a specific angle. The print has a region of a specific shape. Further, the shape of the print region may be text, signals, symbols, or marks. The print may be authentication information, identification information, or individual information, recorded as the shape of the print region or the printed gradation.

Figure 30:
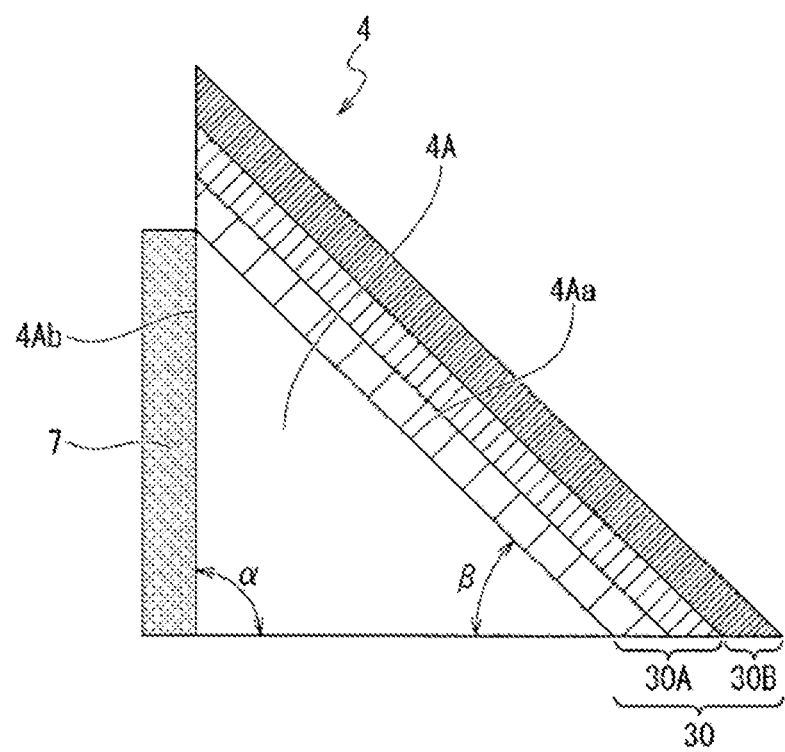
FIG. 30 is a view illustrating an example of modified examples of the first embodiment to the fourth embodiment.

(10) Further, in the configuration of the first embodiment to the fourth embodiment, the optically variable layer 30 may be laminated on at least some of the plurality of microstructures 4A constituting the micro concavo-convex structure layer 4 so as to cover a part or the entirety of the first surface 4Aa as shown in FIG. 30. As described above, the optically variable layer 30 is a layer that optically varies the wavelength of the visible light. The optically variable layer 30 is composed of a multilayer of either or both of the dielectric layer 30A and the metal layer 30B.

The metal layer 30B may be a pure metal and an alloy. The metal may be aluminum, gold, silver, platinum, nickel, tin, chromium, or zirconium, and the alloy may be an alloy of these metals. The dielectric layer 30A can be made of a high refractive index material, a low refractive index material, or a combination thereof. The dielectric layer may include a metal, a metal oxide, a silicon oxide, a metal sulfide, a metal fluoride, or a metal nitride. The metal oxide may be an aluminum oxide, a titanium oxide, or the like. The metal sulfide may be zinc sulfide or the like. The metal fluoride may be magnesium fluoride or the like. The dielectric layer is a single layer or a multilayer.

The metal reflective layer 30B1 provided on the first surface 4Aa may have an integrated transmittance in the visible light wavelength higher than an integrated reflectance.

In this case, after the optically variable layer 30 is formed by repeating deposition, the color layer 7 is formed by coating or the like. The optically variable layer 30 can be composed of a first dielectric multilayer, a metal reflective layer, and a second dielectric layer provided on the micro concavo-convex structure layer in this order. In this case, the optically variable layer 30 can be composed of an interference layer (example of such a material: a multilayer of Ni and SiO) as the first dielectric multilayer, a metal reflective layer (example of such a material: Al), and a fluorinated water-repellent layer as the second dielectric layer (example of the material: MgF). The deposition may be physical deposition or chemical deposition. The physical deposition may be vacuum vapor deposition or sputtering. The fluorinated water-repellent layer can prevent the printing ink or the coated resin from adhering to the first surface 4Aa in formation of the color layer on the second surface 4Ab by printing or coating. Thus, a color layer can be selectively formed on the first surface 4Aa. Further, the first dielectric multilayer causes the motif to be colored, which is displayed under the condition where the display is observed via the micro concavo-convex structure layer. The metal reflective layer reflects light. The reflection of light improves visibility of the display.

The interference layer is formed as a multilayer of different materials. The material of this layer may be any of a metal, a metal compound, and a silicon oxide. The metal may be nickel, aluminum, chromium, silver, or the like. The metal compound may be a metal nitride, a metal oxide, a metal sulfide, or a metal fluoride. The metal nitride may be an aluminum nitride, a titanium nitride, or the like. The metal oxide may be an aluminum oxide, a titanium oxide, or the like. The metal sulfide may be zinc sulfide. The metal fluoride may be magnesium fluoride or calcium fluoride. The interference layer produces interference of visible light. The interference layer reflects light in a particular wavelength range. The material for the metal reflective layer may be a metal. The metal may be aluminum, silver, or the like. The material for the fluorinated water-repellent layer may be a fluoride. The fluoride may be a metal fluoride. The metal fluoride may be magnesium fluoride or calcium fluoride.

The first dielectric multilayer, the metal reflective layer, and the second dielectric layer of the optically variable layer 30 can be formed by the same deposition process. The deposition process can be performed by vacuum vapor deposition. By using the same type of deposition process, the optically variable layer 30 can be formed in-line, in other words, by a single process. The same deposition process may have different processing conditions for deposition.

More specifically, the optically variable layer 30 can be formed by depositing a first dielectric multilayer on the first surface 4Aa of the micro concavo-convex structure layer, depositing a metal reflective layer by the same deposition method as that in deposition of the first dielectric multilayer, and then depositing a second dielectric layer by the same deposition method as that in deposition of the metal reflective layer.

As described above in all the embodiments and modifications, the present embodiment has a special effect to arise an image with a specific color at a specific angle. Therefore, detection of counterfeit products is improved. As a result, high counterfeit prevention effect is achieved. Furthermore, it is possible to provide a display 1 having transparency so that eigen-information of an article can be recognized even when the print layer, in which eigen-information of the item is recorded, is observed through the display 1, and to obtain an optical effect from the micro concavo-convex structure layer expressing rich colors by coloring and a combination of reflection and transmission and good visibility.

In the present embodiment, it is possible to provide a display 1 having a strong counterfeit prevention effect and a wide range of color expression, which optical effect cannot be reproduced by mere replication of the microstructure. The display 1 can be applied to ID cards, passports, and bills, which require high counterfeit prevention effect.

Further, according to the above display, a display having different visual effects in a plurality of observation methods, and thus having high identification performance can be obtained.

EXPERIMENTAL RESULTS

The following description will be given of the experimental results of the display according to an embodiment in which a color layer is applied as a functional layer.

Experimental Result 1

The display 1 according to the present invention was produced by a photopolymer method in the following procedure. In this experimental result, in order to provide a refractive index difference between the micro concavo-convex structure layer 4 and the visual effect imparting layer 8, the micro concavo-convex structure layer 4 was made of a high refractive index material, and the visual effect imparting layer 8 was made of a low refractive index material.

First, a high refractive index layer was formed as the visual effect imparting layer 8 on a support body, which was made of a 23 μm-thick transparent polyethylene terephthalate (PET) film. A visual effect imparting layer ink composition described below was applied by gravure printing at a dry thickness of 1 μm or more and 2 μm or less, and dried by UV exposure at 300 mJ/cm$^2$ with a high-pressure mercury lamp under nitrogen purging environment. OP-38Z had a cured refractive index of 1.38.

Subsequently, the micro concavo-convex structure layer 4 was formed. The microstructure was formed by a roll photopolymer method.

After the micro concavo-convex structure layer ink composition described below was applied by gravure printing at a dry thickness of 10 μm, molding was performed by pressing an original plate of a cylindrical shape having serrated asperities against a coated surface at a press pressure of 2 Kgf/cm$^2$, a press temperature of 80° C., and a press speed of 10 m/min.

While the molding was performed, UV exposure was performed at 300 mJ/cm$^2$ with a high-pressure mercury lamp through the PET film so that the composition was cured at the same time when the concavo-convex shape of the original plate was transferred to the micro concavo-convex structure layer. The "serrated asperities" which become a plurality of microstructures in the molded micro concavo-convex structure layer were the serrated asperities with a depth of 5 μm, a periodicity of 30 μm, and having vertical surfaces and inclined surfaces.

Subsequently, the color layer 7 was formed. First, aluminum was applied by vacuum vapor deposition to the entire surface of the micro concavo-convex structure layer at a thickness of 50 nm in a smooth flat portion to provide a reflective layer. Then, a color layer forming ink was applied at a thickness of 0.5 μm or more and 1 μm or less by using a bar coater, and then dried so that the entire surface of the micro concavo-convex structure layer 4 was colored. The colored display 1 was etched with an alkali to remove the ink deposited on the aluminum together with the aluminum so that the colored surface was left only on the vertical surface. Further, the concealing layer forming ink described below was applied by repeating steps of vapor deposition, coating, and etching to form the concealing layer 9 adjacent to the color layer 7. Thus, the display 1 was obtained.

"Visual Effect Imparting Layer Ink Composition"

UV curable low refractive resin (Defensa OP-3801, manufactured by DIC) 70.0 parts by mass MEK 30.0 parts by mass "Micro Concavo-Convex Structure Layer Ink Composition"

UV curable type high refractive resin (Hypertech UR-108N, manufactured by Nissan Chemical Corporation)

"Color Layer Forming Ink"

Dye (VALIFAST YELLOW 420, manufactured by Orient Chemical Industries Co., Ltd.) 3.4 parts by mass Dye (VALIFAST ORANGE 3209, manufactured by Orient Chemical Industries Co., Ltd.) 1.6 parts by mass Silane coupling agent (DOW CORNING Z6030, manufactured by Toray Dow Corning Corporation) 1.2 parts by mass ME 93.8 parts by mass "Concealing Layer Forming Ink"

Dye (VALIFAST BLACK 1807, manufactured by Orient Chemical Industries Co., Ltd.) 5.0 parts by mass Silane 1.2 parts by mass MEK 93.8 parts by mass Experimental Result 2

A method of producing the display 1 in which the color layer 7 is formed on the inclined surface of the micro structure will be described. The method of forming the visual effect imparting layer 8 and the micro concavo-convex structure layer 4, and the ink used are the same as those in the experimental result 1. The color layer 7 was formed by the same method as in the experimental result 1, in which the material was applied and dried by using a bar coater. Subsequently, the ink for the concealing layer 9 was applied and dried, and then etched by laser irradiation so that the display 1 was obtained in which the color layer 7 and the concealing layer 9 were provided on the vertical surface.

The scope of the present disclosure is not limited to the illustrative embodiment illustrated and described above, but also includes all embodiments that provide effects equivalent to those intended by the present invention. Furthermore, the scope of the present disclosure is not limited to the features of the invention defined in the claims, but includes all the features disclosed herein and all the combinations of these features.

The terms "part," "element," "pixel," "cell," "segment," "unit," "display," and "article" as used herein refer to physical entities. The physical entities can refer to physical embodiments or a spatial embodiment surrounded by a substance. The physical entities may be a structure. The structure may be one having a specific function. A combination of structures having a specific function can perform a synergistic effect due to a combination of the respective functions of the structures.

The terms used in the present disclosure and especially in the appended claims (for example, the text of the appended claims) are generally intended as "open" terms. For example, the term "has" should be interpreted as "at least has," and the term "includes" should be interpreted as "includes, but is not limited to," and the like.

In addition, in interpretation of terms, configurations, features, aspects, and embodiments, the drawings should be referred to. The matters that are clear and obvious from the drawings, as well as the text, should be taken as grounds of correction.

Furthermore, when the claim recitation for introduction of a specific number is intended, such intention does not exist unless expressly stated in the claims. Unless such a statement is provided, such intention does not exist. For example, in order to facilitate understanding, the following appended claims may include the use of introductory phrases "at least one" and "one or more" to introduce listing of claims. However, the use of such terms should not be construed as meaning that introducing the claim recitation by the indefinite article "a" or "an" limits a specific claim including the above claim to an embodiment which includes only one such recitation. The introductory phrase "one or more" or "at least one" and the indefinite article "a" or "an" (for example, "a" and/or "an") should be at least interpreted as meaning "at least one or more." The same applies to the use of definite articles, which are used for introduction of claim recitation.

The entire contents of Japanese Patent Application No. 2017-241723 (filed Dec. 18, 2017) and Japanese Patent Application No. 2017-251632 (filed Dec. 27, 2017), to which the present application claims the benefit of priority, are incorporated herein by reference.

REFERENCE SIGNS LIST

1 . . . Display; 1S . . . Display surface; 4 . . . Micro concavo-convex structure layer; 4A . . . Microstructure; 4Aa . . . First surface; 4Ab . . . Second surface; 4Ac . . . Bottom; 5 . . . Substrate layer; 6 . . . Protective layer; 7, 7a, 7b . . . Color layer; 8 . . . Visual effect imparting layer; 9, 9a, 9b . . . Concealing layer; 20 . . . Magnetic particle 21 . . . Magnet; 30 . . . Optically variable layer; 30A, 30A1, 30A2 . . . Dielectric multilayer; 30B, 30B1, 30B2 . . . Metal reflective layer; H . . . Reference surface.

What is claimed is:

1. A display, comprising:
a micro concavo-convex structure layer provided on a reference surface, which is at a position at an underside of a substrate layer or at a position at an underside of the micro concavo-convex structure layer, the micro concavo-convex structure layer including a plurality of microstructures arranged on the reference surface, wherein
each of the microstructures is formed of a prism structure made of a material having a triangular cross-section, that transmits light, having a first surface inclined relative to the reference surface in side view, and a second surface having an inclination angle relative to the reference surface such that the inclination angle is larger than an inclination angle of the first surface relative to the reference surface,
a functional layer is provided on the second surface of all or some of the plurality of microstructures,
an optically variable layer that optically varies a wavelength of visible light is provided on the first surface, and the optically variable layer is composed of a laminate of a dielectric multilayer and a metal reflective layer, and
the functional layer is an optically variable layer that optically varies a wavelength of visible light the optically variable layer is composed of a laminate having a dielectric multilayer and a metal reflective layer; the optically variable layer laminated on the first surface has a layer thickness larger than that of the optically variable layer laminated on the second surface; the metal reflective layer provided on the second surface has an integrated transmittance in the visible light wavelength region higher than an integrated reflectance; and the metal reflective layer provided on the first surface has an integrated transmittance lower than an integrated reflectance.

2. The display of claim 1, wherein a plurality of regions in which the microstructures are disposed are provided, and in the plurality of regions, a difference in the layer thicknesses between the optically variable layer provided on the second surface and the optically variable layer provided on the first surface at least in a part of the region is different from that in other regions.

3. The display of claim 1, wherein the functional layer is a color layer formed of any of a pigment, ink, metal, and a resin, or a combination thereof.

4. The display of claim 1, wherein the microstructures on which the functional layer is provided contain a plurality of magnetic particles, and the functional layer is formed by the plurality of magnetic particles accumulated on the second surface.

5. A method of producing the display of claim 4, the method comprising a step of accumulating magnetic particles in the microstructures on the second surface by externally applying a magnetic force.

6. The display of claim 1, wherein the microstructures on which the functional layer is provided are made of gas, liquid, or solid.

7. The display of claim 1, wherein the micro concavo-convex structure layer has a higher ratio of transmittance than absorption for at least a specific wavelength of visible light incident thereon.

8. The display of claim 1, wherein the micro concavo-convex structure layer has a reflectance different between a condition where the visible light is irradiated in a direction perpendicular to the reference surface and a condition where the visible light is irradiated in a specific direction, which is different from the perpendicular direction.

9. The display of claim 1, wherein a plurality of regions in which the microstructures are disposed are provided, the plurality of microstructures are formed of periodic structures, and periodicities are different at least in part of the regions.

10. The display of claim 9, wherein the periodicity of the plurality of microstructures is in a range of 1 μm or more and 300 μm or less.

11. The display of claim 1, wherein a visual effect imparting layer is provided at least in part of the reference surface of the micro concavo-convex structure layer, and the visual effect imparting layer is composed of any of a print layer, a reflective layer, and a layer having a refractive index different from that of the micro concavo-convex structure layer, or a combination thereof.

12. The display of claim 11, wherein a plurality of regions in which the microstructures are disposed are provided, and the visual effect imparting layer is different for each region.

13. The display of claim 11, wherein the visual effect imparting layer is an absorption layer that absorbs the wavelength range of light reflected at an inclination angle of the first surface or of the optically variable layer, or the wavelength range of transmitted light.

14. The display of claim 1, wherein a plurality of regions in which the microstructures are disposed are provided, and one or both of an inclination angle of the first surface of the microstructures and an orientation of the microstructures are different for each region.

15. The display of claim 1, wherein a plurality of regions in which the microstructures are disposed are provided, and the functional layer provided on the microstructures is different for each region.

16. The display of claim 1, wherein a concealing layer is provided on an entirety of the functional layer or a part of the functional layer.

17. The display of claim 16, wherein a plurality of regions in which the microstructures are disposed are provided, and the concealing layer provided on the microstructures is different for each region.

18. The display of claim 17, wherein a protective layer is provided on a surface of the micro concavo-convex structure layer on which the reference surface is not provided, the protective layer being made of a material that transmits light and covers asperity of the micro concavo-convex structure layer.

* * * * *